US009397902B2

(12) United States Patent
Dragon et al.

(10) Patent No.: US 9,397,902 B2
(45) Date of Patent: Jul. 19, 2016

(54) METHODS AND SYSTEMS OF TRACKING AND VERIFYING RECORDS OF SYSTEM CHANGE EVENTS IN A DISTRIBUTED NETWORK SYSTEM

(71) Applicant: Rackspace US, Inc., San Antonio, TX (US)

(72) Inventors: Monsyne Michael Dragon, Live Oak, TX (US); Alexander Leonard Walsh, Waverly (CA); Daniel Joseph Spraggins, Garden Ridge, TX (US)

(73) Assignee: RACKSPACE US, INC., San Antonio, TX (US)

( * ) Notice: Subject to any disclaimer, the term of this patent is extended or adjusted under 35 U.S.C. 154(b) by 76 days.

(21) Appl. No.: 13/841,330

(22) Filed: Mar. 15, 2013

(65) Prior Publication Data

US 2014/0214915 A1 Jul. 31, 2014

Related U.S. Application Data

(63) Continuation-in-part of application No. 13/752,147, filed on Jan. 28, 2013, and a continuation-in-part of application No. 13/752,255, filed on Jan. 28, 2013, and a continuation-in-part of application No. 13/752,234, filed on Jan. 28, 2013.

(51) Int. Cl.
*G06F 17/00* (2006.01)
*G06F 7/00* (2006.01)
(Continued)

(52) U.S. Cl.
CPC ............ *H04L 43/04* (2013.01); *H04L 12/1432* (2013.01); *H04L 43/0817* (2013.01)

(58) Field of Classification Search
CPC ......................... G06F 9/5022; G06F 2201/87

USPC .......................................................... 707/611
See application file for complete search history.

(56) References Cited

U.S. PATENT DOCUMENTS 5,742,803 A 4/1998 Igarashi et al.
6,026,362 A 2/2000 Kim et al.
(Continued)

FOREIGN PATENT DOCUMENTS

CN 103036974 A 12/2012
WO 2013/119841 A1 8/2013

OTHER PUBLICATIONS

Openstack LLC, "OpenStack: Install and Deploy Manual," (available at http://docs.openstack.org), May 31, 2012, (99 pages).
(Continued)

*Primary Examiner* — Pavan Mamillapalli
(74) *Attorney, Agent, or Firm* — Fogarty, L.L.C.

(57) ABSTRACT

This disclosure has reference to verifying records of system change events in a distributed network system providing cloud services. In one embodiment, the methods and systems observe system update messages sent and received among components of the distributed network system, generate a record of the state of the object in response to the update messages, and compare the record of the state of the object with information from a periodic system status message to verify the accuracy of the periodic system status message. Advantageously, the present embodiments provide increased reliability for system status tracking, resource management, and billing for consumption of resources in distributed network systems. Additional benefits and advantages of the present embodiments will become evident in the following description.

31 Claims, 15 Drawing Sheets

(51) Int. Cl.
*H04L 12/26* (2006.01)
*H04L 12/14* (2006.01)

(56) References Cited

U.S. PATENT DOCUMENTS

| | | | |
|---|---|---|---|
| 6,115,462 | A | 9/2000 | Servi et al. |
| 6,230,312 | B1 | 5/2001 | Hunt |
| 6,351,843 | B1 | 2/2002 | Berkley et al. |
| 6,381,735 | B1 | 4/2002 | Hunt |
| 6,499,137 | B1 | 12/2002 | Hunt |
| 6,546,553 | B1 | 4/2003 | Hunt |
| 6,629,123 | B1 | 9/2003 | Hunt |
| 6,633,910 | B1* | 10/2003 | Rajan ............... G06F 17/30899 707/E17.121 |
| 6,718,414 | B1 | 4/2004 | Doggett |
| 6,965,861 | B1 | 11/2005 | Dailey et al. |
| 6,996,808 | B1 | 2/2006 | Niewiadomski et al. |
| 7,089,583 | B2 | 8/2006 | Mehra et al. |
| 7,263,689 | B1 | 8/2007 | Edwards et al. |
| 7,321,844 | B1 | 1/2008 | Holley et al. |
| 7,353,507 | B2 | 4/2008 | Gazdik et al. |
| 7,356,443 | B2 | 4/2008 | Barford |
| 7,454,486 | B2 | 11/2008 | Kaler et al. |
| 7,523,465 | B2 | 4/2009 | Aamodt et al. |
| 7,571,478 | B2 | 8/2009 | Munson et al. |
| 7,840,618 | B2 | 11/2010 | Zhang et al. |
| 8,135,847 | B2 | 3/2012 | Pujol et al. |
| 8,280,683 | B2 | 10/2012 | Finkler |
| 8,352,431 | B1* | 1/2013 | Protopopov et al. ......... 707/640 |
| 8,589,893 | B1 | 11/2013 | Allen |
| 8,595,709 | B2 | 11/2013 | Rao et al. |
| 8,612,599 | B2 | 12/2013 | Tung et al. |
| 8,689,172 | B2 | 4/2014 | Amaral et al. |
| 8,805,971 | B1* | 8/2014 | Roth .................... G06F 9/5072 709/203 |
| 8,819,701 | B2 | 8/2014 | Wheeler et al. |
| 8,856,319 | B1* | 10/2014 | Huang ................. G06F 9/5077 709/224 |
| 2003/0084158 | A1 | 5/2003 | Saito et al. |
| 2004/0078464 | A1* | 4/2004 | Rajan ................... G06Q 30/02 709/224 |
| 2004/0139194 | A1 | 7/2004 | Naganathan |
| 2006/0158354 | A1 | 7/2006 | Aberg et al. |
| 2007/0283331 | A1 | 12/2007 | Pietrek |
| 2008/0052387 | A1 | 2/2008 | Heinz et al. |
| 2008/0232358 | A1 | 9/2008 | Baker et al. |
| 2009/0077543 | A1 | 3/2009 | Siskind et al. |
| 2009/0192847 | A1 | 7/2009 | Lipkin et al. |
| 2009/0276771 | A1 | 11/2009 | Nickolov et al. |
| 2010/0125745 | A1 | 5/2010 | Kogan et al. |
| 2010/0174813 | A1 | 7/2010 | Hildreth et al. |
| 2010/0319004 | A1 | 12/2010 | Hudson et al. |
| 2011/0071988 | A1 | 3/2011 | Resch et al. |
| 2011/0099146 | A1 | 4/2011 | McAlister et al. |
| 2011/0099420 | A1 | 4/2011 | MacDonald McAlister et al. |
| 2011/0239194 | A1 | 9/2011 | Braude |
| 2011/0251937 | A1* | 10/2011 | Falk ...................... G06F 21/10 705/34 |
| 2011/0252071 | A1* | 10/2011 | Cidon ............... G06F 17/30174 707/802 |
| 2011/0283266 | A1 | 11/2011 | Gallagher et al. |
| 2011/0289440 | A1 | 11/2011 | Carter et al. |
| 2012/0011153 | A1 | 1/2012 | Buchanan et al. |
| 2012/0102471 | A1* | 4/2012 | Artzi ...................... G06F 8/30 717/133 |
| 2012/0102572 | A1 | 4/2012 | Murakami et al. |
| 2012/0158590 | A1* | 6/2012 | Salonen ................ G06Q 10/02 705/44 |
| 2012/0167057 | A1 | 6/2012 | Schmich et al. |
| 2012/0254284 | A1 | 10/2012 | Tamura |
| 2012/0260134 | A1 | 10/2012 | Doddavula et al. |
| 2012/0284314 | A1* | 11/2012 | Nagpal ............. G06F 17/30371 707/822 |
| 2012/0317274 | A1 | 12/2012 | Richter et al. |
| 2013/0103837 | A1 | 4/2013 | Krueger |
| 2013/0117748 | A1 | 5/2013 | Cooper et al. |
| 2013/0124669 | A1 | 5/2013 | Anderson et al. |
| 2013/0152047 | A1 | 6/2013 | Moorthi et al. |
| 2013/0160128 | A1 | 6/2013 | Dolan-Gavitt et al. |
| 2013/0166962 | A1 | 6/2013 | Branson et al. |
| 2013/0275557 | A1 | 10/2013 | Myers et al. |
| 2013/0282540 | A1* | 10/2013 | Bliesner ................ G06Q 30/04 705/34 |
| 2013/0326625 | A1 | 12/2013 | Anderson et al. |
| 2014/0068769 | A1 | 3/2014 | Neil |
| 2014/0115403 | A1 | 4/2014 | Rhee et al. |
| 2014/0129160 | A1 | 5/2014 | Tran |
| 2014/0180915 | A1* | 6/2014 | Montulli et al. ................. 705/40 |
| 2014/0208296 | A1 | 7/2014 | Dang et al. |
| 2014/0214745 | A1 | 7/2014 | Walsh |
| 2014/0215057 | A1 | 7/2014 | Walsh et al. |
| 2014/0215443 | A1 | 7/2014 | Voccio et al. |
| 2014/0222873 | A1 | 8/2014 | Nakadai |
| 2014/0337520 | A1 | 11/2014 | Raleigh et al. |

OTHER PUBLICATIONS

Chang Ho Choi et al: "CSMonitor: a visual client/server monitor for CORBA-based distributed applications", Sofiware Engineering Conference, 1998. Proceedings. 1998 Asia Pacific Taipei, Taiwan Dec. 2-4, 1998, Los Alamitos, CA, USA, IEEE Comput. Soc, US, Dec. 2, 1998, pp. 338-345, XP010314829, DOI: 10.1109/APSEC.1998. 733738: ISBN: 978-0-8186-9183-6.

Moe J et al: "Understanding distributed systems via execution trace data", Program Comprehension, 2001. IWPC 2001. Proceedings. 9th International Workshop on May 12-13, 2001, Piscataway, NJ, USA, IEEE, May 12, 2001, pp. 60-67, XP010541004, ISBN: 978-0-7695-1131-3.

Andrews Ayers et al: "TraceBack", Proceedings of the 2009 ACM SIGPLAN Conference on Programming Language Design and Implementation, PLDI '09, vol. 40, No. 6, Jun. 12, 2005, p. 201, XP055108756, New York, New York, USA, ISSN: 0362-1340, DOI: 10.1145/1064978.1065035: ISBN: 978-1-60-558392-1.

Baah G K et al: "The Probabilistic Program Dependence Graph and Its Application to Fault Diagnosis", IEEE Transactions on Software Engineering, IEEE Service Center, Los Alamitos, CA, US, vol. 36, No. 4, Jul. 1, 2010, pp. 528-545, XP011299543, ISSN: 0098-5589.

Alexander Ihler et al: "Learning to detect events with Markov-modulated poisson processes", ACM Transactions on Knowledge Discovery From Data, vol. 1, No. 3, Dec. 1, 2007, pp. 13-33s, XP055108758, ISSN: 1556-4681, DOI: 10.1145/1297332.1297337.

Anonymous, "Valgrind Documentation Release 3.8.0", Aug. 20, 2012, pp. 1-320, XP055113787, http://valgrind.org/downloads/ valgrind.

& Nn, "Valgrind Archive 3.8.1 screenshot", Aug. 10, 2012, pp. 1-1, http://valgrind.org/downloads/valgrind- 3.8.1. tarbz2.

Tilman Kostner et al., "Argument Controlled Profiling", Aug. 25, 2009, Technische Universitii.t MOnchen, Germany.

Nicholas Nethercote et al, "Valgrind—A Program Supervision Framework", Electronic Notes in Theoretical Computer Science, Oct. 1, 2003, pp. 1-23, vol. 89, No. 2, Elsevier, Amsterdam, NL.

* cited by examiner

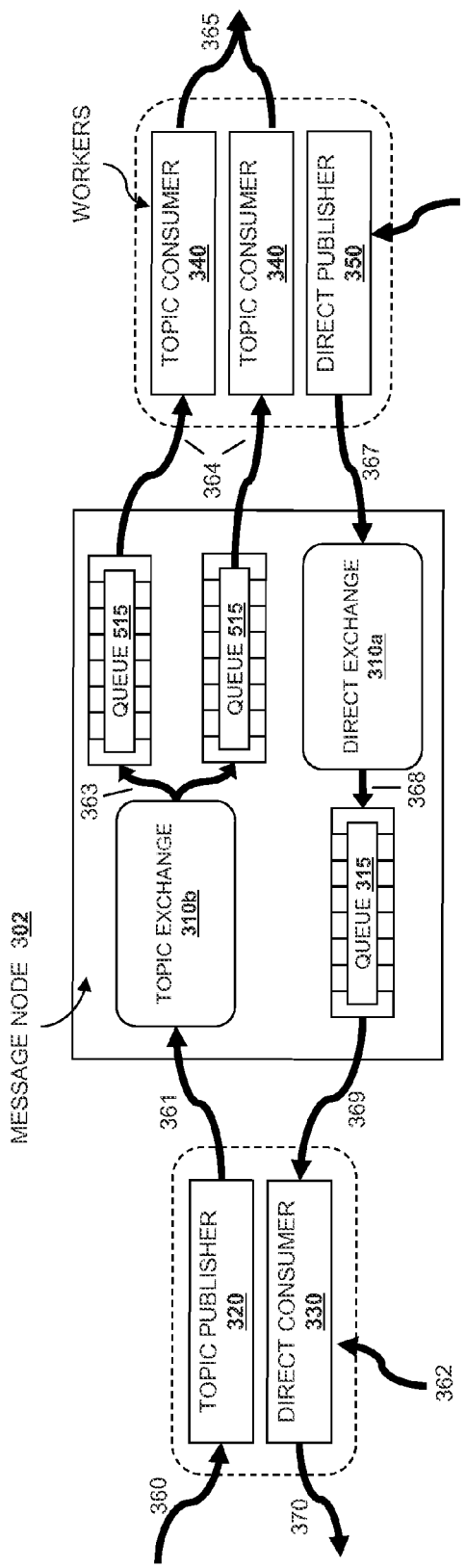

METHODS AND SYSTEMS OF TRACKING AND VERIFYING RECORDS OF SYSTEM CHANGE EVENTS IN A DISTRIBUTED NETWORK SYSTEM

This application is a continuation-in-part of, and claims priority to, co-pending non-provisional U.S. patent application Ser. No. 13/752,147 entitled "Methods and Systems of Distributed Tracing," filed Jan. 28, 2013, Ser. No. 13/752,255 entitled "Methods and Systems of Generating a billing feed of a distributed network," filed Jan. 28, 2013, and Ser. No. 13/752,234 entitled "Methods and Systems of Function-Specific Tracing," filed Jan. 28, 2013, each of which are incorporated, in their entirety, herein by reference. This application is related to co-pending non-provisional U.S. patent application Ser. No. 13/841,446 entitled "Methods and Systems of Monitoring Failures in a Distributed Network System," filed Mar. 15, 2013, and Ser. No. 13/841,552 entitled "Methods and Systems of Predictive Monitoring of Objects in a Distributed Network System," filed Mar. 15, 2013, each of which are incorporated, in their entirety, herein by reference.

BACKGROUND

The present disclosure relates generally to cloud computing, and more particularly to systems and methods of tracking and verifying records of system change events in a distributed network system providing cloud services.

It is useful, for a variety of reasons, to track system resource usage, system status, and system object states. Some distributed network systems generate periodic system status messages. For example, a system may generate a daily object state notification based upon an object state, which may change from time to time in a given day. In such an example, the system object may be a Virtual Machine (VM) which is built using distributed network resources such as storage drives, memory, and processing bandwidth, and communication bandwidth. It may be useful to track the state of the VM for billing purposes, system resource management, orphan control, etc.

There is currently no means for verifying the accuracy of system state notifications, which can lead to billing errors, system resource mismanagement, and other undesirable errors. System state tracking notifications may be inaccurate for various reasons, including missed system update notifications, errors or faults during system setup or system update, or glitches in system state tracking facilities. These faults can lead to costly billing or system resource management errors. Additionally, it may be very difficult to trace the source of the error.

BRIEF DESCRIPTION OF THE DRAWINGS

FIG. 3*b* is a diagram showing how a directed message is sent using the message service according to various embodiments.

FIG. 3*c* is a diagram showing how a broadcast message is sent using the message service according to various embodiments.

DETAILED DESCRIPTION

The following disclosure has reference to verifying records of system change events in a distributed network system providing cloud services.

In one embodiment, the methods and systems observe system update messages sent and received among components of the distributed network system, generate a record of the state of the object in response to the update messages, and compare the record of the state of the object with information from a periodic system status message to verify the accuracy of the periodic system status message. Advantageously, the present embodiments provide increased reliability for system status tracking, resource management, and billing for consumption of resources in distributed network systems. Additional benefits and advantages of the present embodiments will become evident in the following description.

Figure 1A:
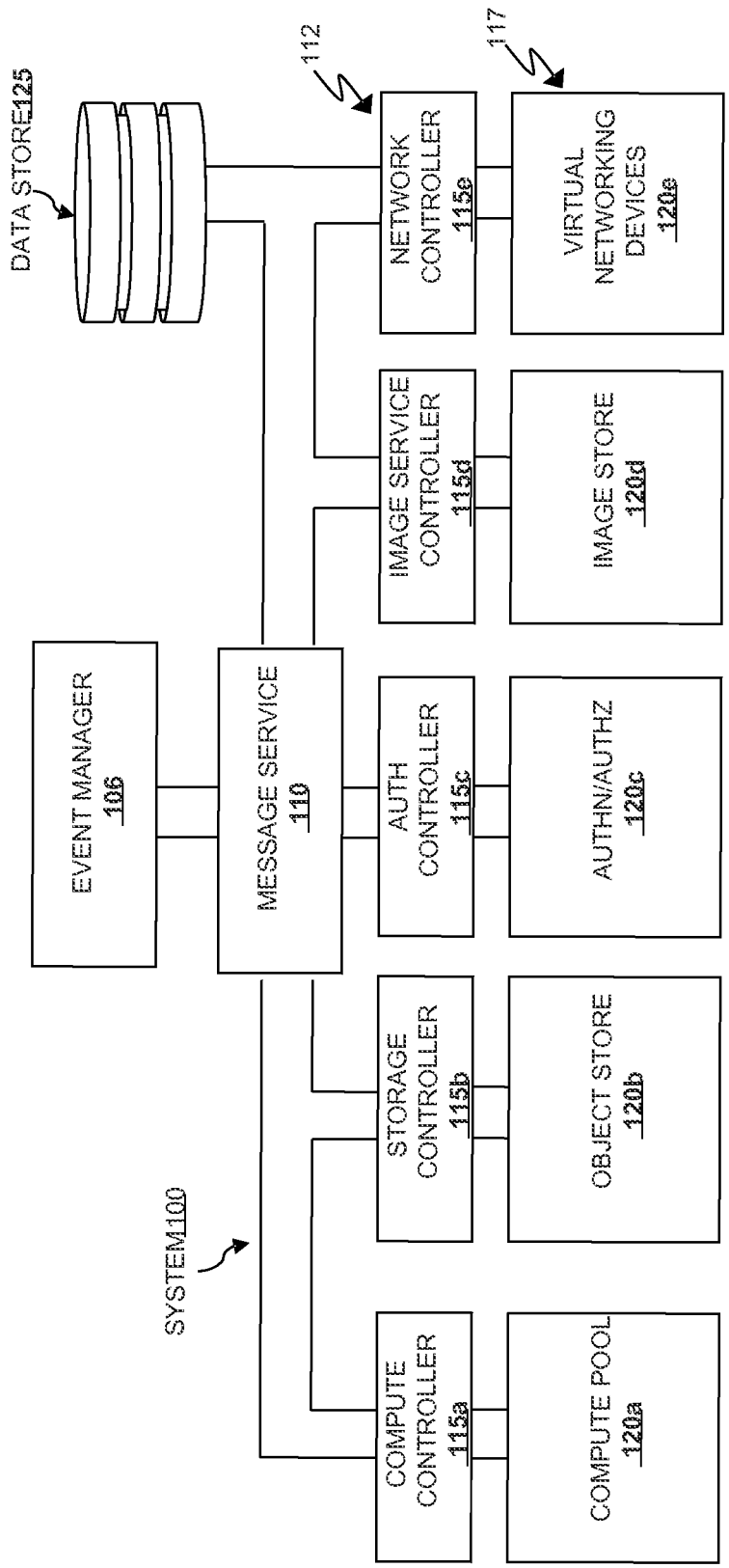
FIG. 1*a* is a schematic view of a distributed system.

FIG. 1A illustrates a simplified diagram of a distributed application 100 for which various embodiments of verification of records of system change events in a distributed network system may be implemented. It should be appreciated that application 100 is provided merely as an example and that other suitable distributed applications, middleware, or computing systems can benefit from distributed system status verification capabilities described herein. According to one embodiment, application 100 may be a cloud service.

According to one embodiment, application 100 includes event manager 106 configured to provide system event management services. As will be described in more detail below, event management can include verification of system/object update records and tracking of system/object states. By way of example, event manager 106 can observe messages within the distributed application across queues and from particular components of the application. As depicted in FIG. 1A, event manager 106 interfaces with message service 110 of application 100. Message service 110 connects various subsystems of the application 100, and message service 110 may be configured to pass messages relative to one or more elements of system 100.

System 100 may include one or more subsystems, such as controllers 112 and services 117. System 100 may include one or more controllers 112 for the application to be employed in a distributed architecture, such as cloud computing services. As depicted in FIG. 1A, controllers 112 include a compute controller 115a, a storage controller 115b, auth controller 115c, image service controller 115d and network controller 115e. Controllers 115 are described with reference to a cloud computing architecture in FIG. 1. By way of example, network controller 115a deals with host machine network configurations and can perform operations for allocating IP addresses, configuring VLANs, implementing security groups and configuring networks. Each of controllers 112 may interface with one or more services. As depicted in FIG. 1A, compute controller 115a interfaces with compute pool 120a, storage controller 115b may interface with object store 120b, auth controller 115c may interface with authentication/authorization controller 120c, image service controller 115d may interface with image store 120d and network controller 115e may interface with virtual networking devices 120e. Although controllers 115 and services 120 are with reference to an open architecture, it should be appreciated that the methods and systems for tracing may be equally applied to other distributed applications.

Figure 1B:
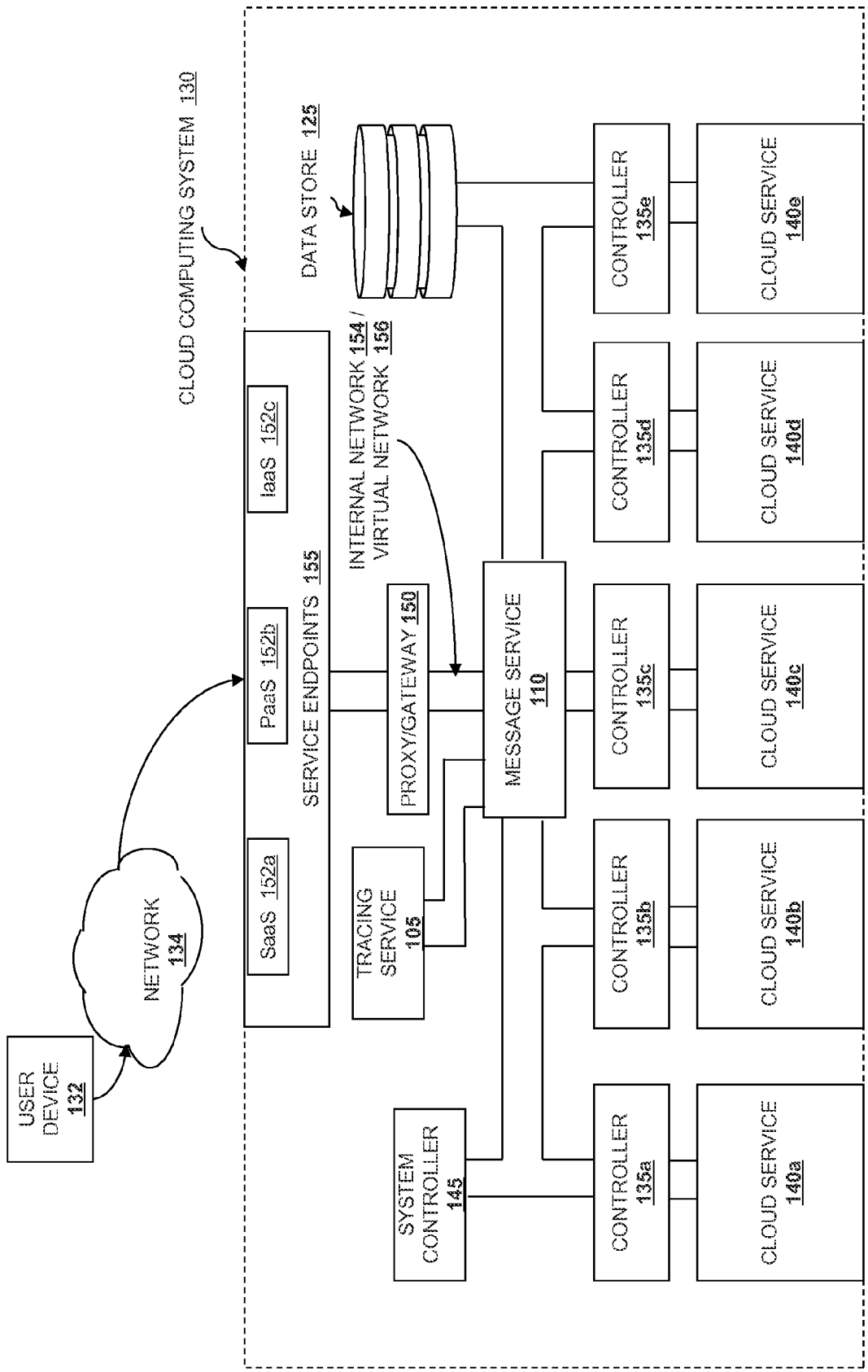
FIG. 1*b* is a schematic view illustrating an external view of a cloud computing system.

Referring now to FIG. 1b, an external view of a cloud computing system 130 is illustrated. Cloud computing system 130 includes event manager 106 and message service 110. According to one embodiment, event manager 106 can observe messages of cloud computing system 130 and verify the accuracy of periodic system status messages issued by various components or objects of the could computing system 130. According to another embodiment, controllers and services of the cloud computing system 130 may include event managers to verify the periodic system status messages provided by each respective controller or service.

The cloud computing system 130 includes a user device 132 connected to a network 134 such as, for example, a Transport Control Protocol/Internet Protocol (TCP/IP) network (e.g., the Internet.) The user device 132 is coupled to the cloud computing system 130 via one or more service endpoints 155. Depending on the type of cloud service provided, these endpoints give varying amounts of control relative to the provisioning of resources within the cloud computing system 130. For example, SaaS endpoint 152a typically only gives information and access relative to the application running on the cloud storage system, and the scaling and processing aspects of the cloud computing system is obscured from the user. PaaS endpoint 152b typically gives an abstract Application Programming Interface (API) that allows developers to declaratively request or command the backend storage, computation, and scaling resources provided by the cloud, without giving exact control to the user. IaaS endpoint 152c typically provides the ability to directly request the provisioning of resources, such as computation units (typically virtual machines), software-defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions. This allows the cloud computing system 130 to be used for new, user-defined services without requiring specific support.

It is important to recognize that the control allowed via an IaaS endpoint is not complete. Within the cloud computing system 130 are one or more cloud controllers 135 (running what is sometimes called a "cloud operating system") that work on an even lower level, interacting with physical machines, managing the contradictory demands of the multi-tenant cloud computing system 130. In one embodiment, these correspond to the controllers and services discussed relative to FIG. 1a. The workings of the cloud controllers 135 are typically not exposed outside of the cloud computing system 130, even in an IaaS context. In one embodiment, the commands received through one of the service endpoints 155 are then routed via one or more internal networks 154. The internal network 154 couples the different services to each other. The internal network 154 may encompass various protocols or services, including but not limited to electrical, optical, or wireless connections at the physical layer; Ethernet, Fiber channel, ATM, and SONET at the MAC layer; TCP, UDP, ZeroMQ or other services at the connection layer; and XMPP, HTTP, AMPQ, STOMP, SMS, SMTP, SNMP, or other standards at the protocol layer. The internal network 154 is typically not exposed outside the cloud computing system, except to the extent that one or more virtual networks 156 may be exposed that control the internal routing according to various rules. The virtual networks 156 typically do not expose as much complexity as may exist in the actual internal network 154; but varying levels of granularity can be exposed to the control of the user, particularly in IaaS services.

In one or more embodiments, it may be useful to include various processing or routing nodes in the network layers 154 and 156, such as proxy/gateway 150. Other types of processing or routing nodes may include switches, routers, switch fabrics, caches, format modifiers, or correlators. These processing and routing nodes may or may not be visible to the outside. It is typical that one level of processing or routing nodes may be internal only, coupled to the internal network 154, whereas other types of network services may be defined by or accessible to users, and show up in one or more virtual networks 156. Either of the internal network 154 or the virtual networks 156 may be encrypted or authenticated according to the protocols and services described below.

In various embodiments, one or more parts of the cloud computing system 130 may be disposed on a single host. Accordingly, some of the "network" layers 154 and 156 may be composed of an internal call graph, inter-process communication (IPC), or a shared memory communication system.

Once a communication passes from the endpoints via a network layer 154 or 156, as well as possibly via one or more switches or processing devices 150, it is received by one or more applicable cloud controllers 135. The cloud controllers 135 are responsible for interpreting the message and coordinating the performance of the necessary corresponding services, returning a response if necessary. Although the cloud controllers 135 may provide services directly, more typically the cloud controllers 135 are in operative contact with the service resources 140 necessary to provide the corresponding services. For example, it is possible for different services to be provided at different levels of abstraction. For example, a service 140a may be a "compute" service that will work at an IaaS level, allowing the creation and control of user-defined virtual computing resources. In addition to the services discussed relative to FIG. 1a, a cloud computing system 130 may provide a declarative storage API, a SaaS-level Queue service 140c, a DNS service 140d, or a Database service 140e, or other application services without exposing any of the underlying scaling or computational resources. Other services are contemplated as discussed in detail below.

In various embodiments, various cloud computing services or the cloud computing system itself may require a message passing system. The message routing service 110 is available to address this need, but it is not a required part of the system architecture in at least one embodiment. In one embodiment, the message routing service is used to transfer messages from one component to another without explicitly linking the state of the two components. Note that this message routing service 110 may or may not be available for user-addressable systems; in one preferred embodiment, there is a separation between storage for cloud service state and for user data, including user service state.

In various embodiments, various cloud computing services or the cloud computing system itself may require a persistent storage for system state. The data store 125 is available to address this need, but it is not a required part of the system architecture in at least one embodiment. In one embodiment, various aspects of system state are saved in redundant databases on various hosts or as special files in an object storage service. In a second embodiment, a relational database service is used to store system state. In a third embodiment, a column, graph, or document-oriented database is used. Note that this persistent storage may or may not be available for user-addressable systems; in one preferred embodiment, there is a separation between storage for cloud service state and for user data, including user service state.

In various embodiments, it may be useful for the cloud computing system 130 to have a system controller 145. In one embodiment, the system controller 145 is similar to the cloud computing controllers 135, except that it is used to control or direct operations at the level of the cloud computing system 130 rather than at the level of an individual service.

For clarity of discussion above, only one user device 132 has been illustrated as connected to the cloud computing system 130, and the discussion generally referred to receiving a communication from outside the cloud computing system, routing it to a cloud controller 135, and coordinating processing of the message via a service 130, the infrastructure described is also equally available for sending out messages. These messages may be sent out as replies to previous communications, or they may be internally sourced. Routing messages from a particular service 130 to a user device 132 is accomplished in the same manner as receiving a message from user device 132 to a service 130, just in reverse. The precise manner of receiving, processing, responding, and sending messages is described below with reference to the various discussed service embodiments. One of skill in the art will recognize, however, that a plurality of user devices 132 may, and typically will, be connected to the cloud computing system 130 and that each element or set of elements within the cloud computing system is replicable as necessary. Further, the cloud computing system 130, whether or not it has one endpoint or multiple endpoints, is expected to encompass embodiments including public clouds, private clouds, hybrid clouds, and multi-vendor clouds.

Figure 2:
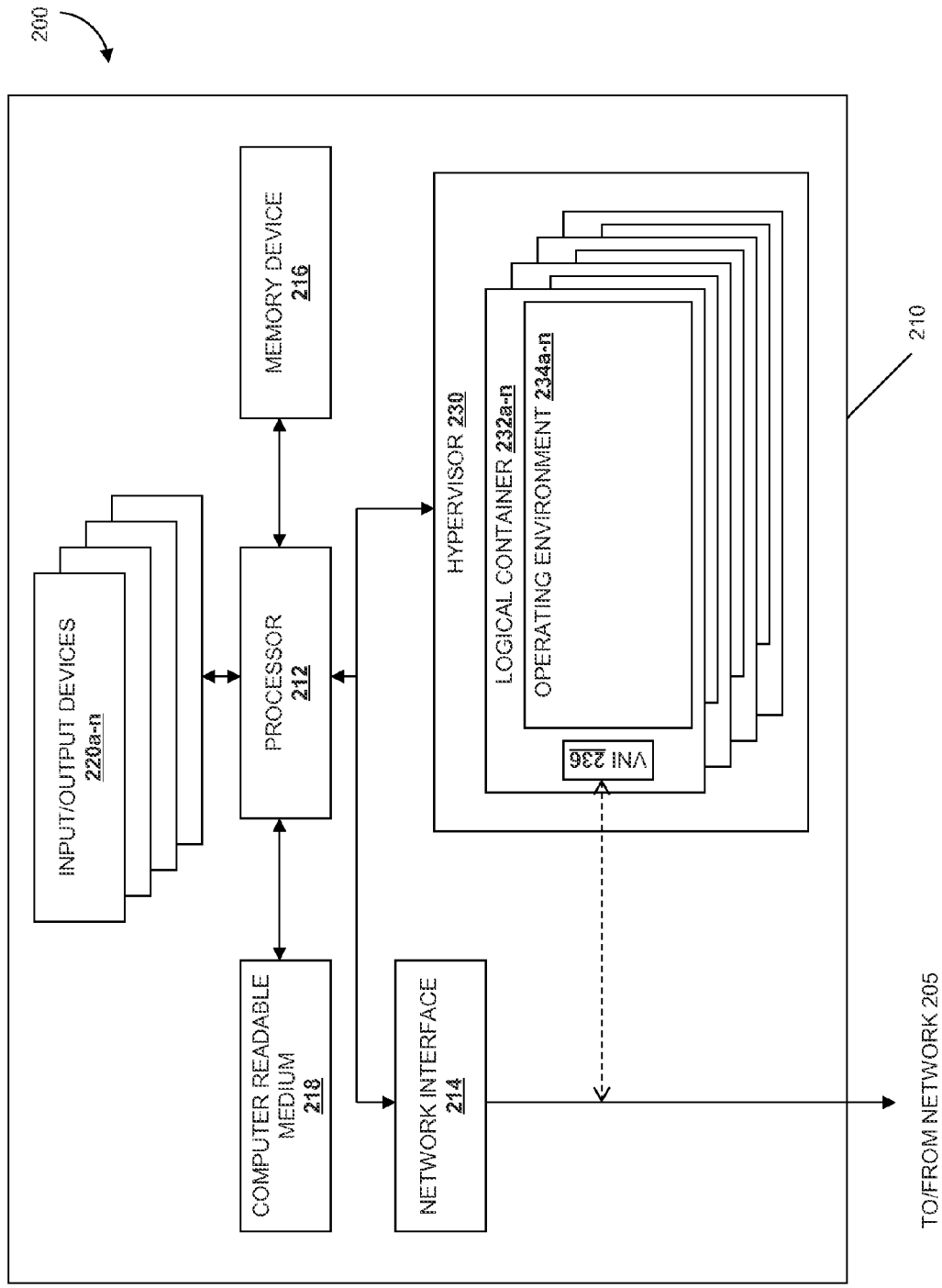
FIG. 2 is a schematic view illustrating an information processing system as used in various embodiments.

Each of the user device 132, the cloud computing system 130, the endpoints 152, the cloud controllers 135 and the cloud services 140 typically include a respective information processing system, a subsystem, or a part of a subsystem for executing processes and performing operations (e.g., processing or communicating information). An information processing system is an electronic device capable of processing, executing or otherwise handling information, such as a computer. FIG. 2 shows an information processing system 210 that is representative of one of, or a portion of, the information processing systems described above.

Referring now to FIG. 2, diagram 200 shows an information processing system 210 configured to host one or more virtual machines, coupled to a network 205. The network 205 could be one or both of the networks 154 and 156 described above. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 210 shown is representative of, one of, or a portion of, the information processing systems described above.

The information processing system 210 may include any or all of the following: (a) a processor 212 for executing and otherwise processing instructions, (b) one or more network interfaces 214 (e.g., circuitry) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below.

In one embodiment, there is more than one network interface 214, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 210 may include a plurality of input/output devices 220a-n which are operably coupled to the processor 212, for inputting or outputting information, such as a display device 220a, a print device 220b, or other electronic circuitry 220c-n for performing other operations of the information processing system 210 known in the art.

With reference to the computer-readable media, including both memory device 216 and secondary computer-readable medium 218, the computer-readable media and the processor 212 are structurally and functionally interrelated with one another as described below in further detail, and information processing system of the illustrative embodiment is structurally and functionally interrelated with a respective computer-readable medium similar to the manner in which the processor 212 is structurally and functionally interrelated with the computer-readable media 216 and 218. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 200). Such interrelationships permit the data structures' functionality to be realized. For example, in one embodiment the processor 212 reads (e.g., accesses or copies) such functional descriptive material from the network interface 214, the computer-readable media 218 onto the memory device 216 of the information processing system 210, and the information processing system 210 (more particularly, the processor 212) performs its operations, as described elsewhere herein, in response to such material stored in the memory device of the information processing system 210. In addition to reading such functional descriptive material from the computer-readable medium 218, the processor 212 is capable of reading such functional descriptive material from (or through) the network 105. In one embodiment, the information processing system 210 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 210, without limiting them to a specific location or implementation.

The information processing system 210 includes a hypervisor 230. The hypervisor 230 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 218. The hypervisor may be included logically "below" a host operating system, as a host itself, as part of a larger host operating system, or as a program or process running "above" or "on top of" a host operating system. Examples of hypervisors include Xenserver, KVM, VMware, Microsoft's Hyper-V, and emulation programs such as QEMU.

The hypervisor 230 includes the functionality to add, remove, and modify a number of logical containers 232a-n associated with the hypervisor. Zero, one, or many of the logical containers 232a-n contain associated operating environments 234a-n. The logical containers 232a-n can implement various interfaces depending upon the desired characteristics of the operating environment. In one embodiment, a logical container 232 implements a hardware-like interface, such that the associated operating environment 234 appears to be running on or within an information processing system such as the information processing system 210. For example, one embodiment of a logical container 234 could implement an interface resembling an x86, x86-64, ARM, or other computer instruction set with appropriate RAM, busses, disks, and network devices. A corresponding operating environment 234 for this embodiment could be an operating system such as Microsoft Windows, Linux, Linux-Android, or Mac OS X. In another embodiment, a logical container 232 implements an operating system-like interface, such that the associated operating environment 234 appears to be running on or within an operating system. For example one embodiment of this type of logical container 232 could appear to be a Microsoft Windows, Linux, or Mac OS X operating system. Another possible operating system includes an Android operating system, which includes significant runtime functionality on top of a lower-level kernel. A corresponding operating environment 234 could enforce separation between users and processes such that each process or group of processes appeared to have sole access to the resources of the operating system. In a third environment, a logical container 232 implements a software-defined interface, such a language runtime or logical process that the associated operating environment 234 can use to run and interact with its environment. For example one embodiment of this type of logical container 232 could appear to be a Java, Dalvik, Lua, Python, or other language virtual machine. A corresponding operating environment 234 would use the built-in threading, processing, and code loading capabilities to load and run code. Adding, removing, or modifying a logical container 232 may or may not also involve adding, removing, or modifying an associated operating environment 234. For ease of explanation below, these operating environments will be described in terms of an embodiment as "Virtual Machines," or "VMs," but this is simply one implementation among the options listed above.

In one or more embodiments, a VM has one or more virtual network interfaces 236. How the virtual network interface is exposed to the operating environment depends upon the implementation of the operating environment. In an operating environment that mimics a hardware computer, the virtual network interface 236 appears as one or more virtual network interface cards. In an operating environment that appears as an operating system, the virtual network interface 236 appears as a virtual character device or socket. In an operating environment that appears as a language runtime, the virtual network interface appears as a socket, queue, message service, or other appropriate construct. The virtual network interfaces (VNIs) 236 may be associated with a virtual switch (Vswitch) at either the hypervisor or container level. The VNI 236 logically couples the operating environment 234 to the network, and allows the VMs to send and receive network traffic. In one embodiment, the physical network interface card 214 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

Message Service

Between the various virtual machines and virtual devices, it may be necessary to have a reliable messaging infrastructure. In various embodiments, a message queuing service is used for both local and remote communication so that there is no requirement that any of the services exist on the same physical machine. Various existing messaging infrastructures are contemplated, including AMQP, ZeroMQ, STOMP and XMPP. Note that this messaging system may or may not be available for user-addressable systems; in one preferred embodiment, there is a separation between internal messaging services and any messaging services associated with user data.

In one embodiment, the message service sits between various components and allows them to communicate in a loosely coupled fashion. This can be accomplished using Remote Procedure Calls (RPC hereinafter) to communicate between components, built atop either direct messages and/or an underlying publish/subscribe infrastructure. In a typical embodiment, it is expected that both direct and topic-based exchanges are used. This allows for decoupling of the components, full asynchronous communications, and transparent balancing between equivalent components. In some embodiments, calls between different APIs can be supported over the distributed system by providing an adapter class which takes care of marshalling and unmarshalling of messages into function calls.

In one embodiment, a cloud controller 135 (or the applicable cloud service 140) creates two queues at initialization time, one that accepts node-specific messages and another that accepts generic messages addressed to any node of a particular type. This allows both specific node control as well as orchestration of the cloud service without limiting the particular implementation of a node. In an embodiment in which these message queues are bridged to an API, the API can act as a consumer, server, or publisher.

Figure 3A:
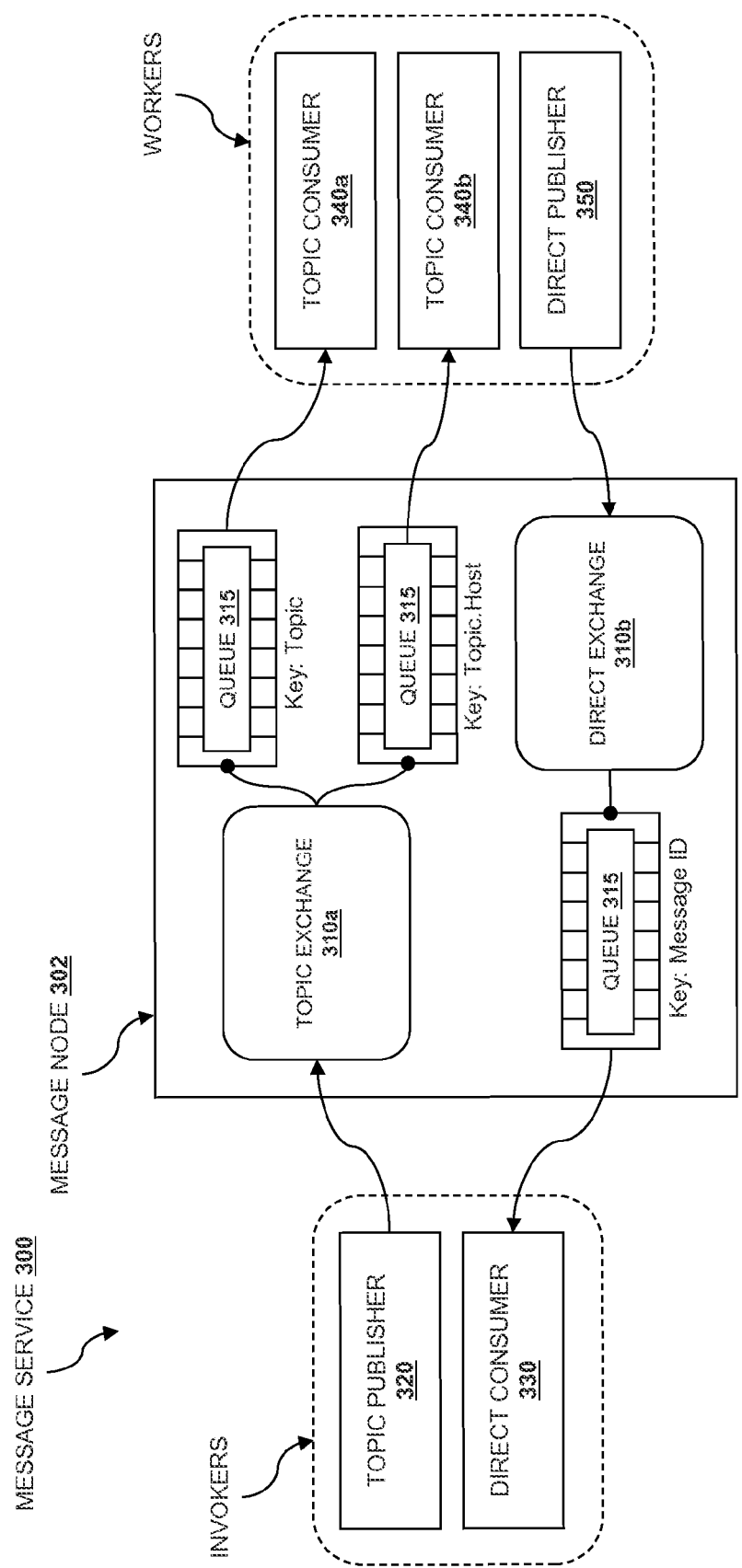
FIG. 3*a* shows a message service system according to various embodiments.

Turning now to FIG. 3a, one implementation of a message service 110 is shown. For simplicity of description, FIG. 3a shows the message service 300 when a single instance is deployed and shared in the cloud computing system 130, but the message service can be either centralized or fully distributed.

In one embodiment, the message service 300 keeps traffic associated with different queues or routing keys separate, so that disparate services can use the message service without interfering with each other. Accordingly, the message queue service may be used to communicate messages between network elements, between cloud services 140, between cloud controllers 135, between network elements, or between any group of sub-elements within the above. More than one message service may be used, and a cloud service 140 may use its own message service as required.

For clarity of exposition, access to the message service will be described in terms of "Invokers" and "Workers," but these labels are purely expository and are not intended to convey a limitation on purpose; in some embodiments, a single component (such as a VM) may act first as an Invoker, then as a Worker, the other way around, or simultaneously in each role. An Invoker is a component that sends messages in the system via two operations: 1) an RPC (Remote Procedure Call) directed message and ii) an RPC broadcast. A Worker is a component that receives messages from the message system and replies accordingly.

In one embodiment, there is a message node 302 including one or more exchanges 310. In a second embodiment, the message system is "brokerless," and one or more exchanges are located at each client. The exchanges 310 act as internal message routing elements so that components interacting with the message service can send and receive messages. In one embodiment, these exchanges are subdivided further into a topic exchange 310a and a direct exchange 310b. An exchange 310 is a routing structure or system that exists in a particular context. In a one embodiment, multiple contexts can be included within a single message service with each one acting independently of the others. In one embodiment, the type of exchange, such as a topic exchange 310a vs. direct exchange 310b determines the routing policy. In a second embodiment, the routing policy is determined via a series of routing rules evaluated by the exchange 310.

The direct exchange 310a is a routing element created during or for RPC directed message operations. In one embodiment, there are many instances of a direct exchange 310a that are created as needed for the message service. In a further embodiment, there is one direct exchange 310a created for each RPC directed message received by the system.

The topic exchange 310a is a routing element created during or for RPC directed broadcast operations. In one simple embodiment, every message received by the topic exchange is received by every other connected component. In a second embodiment, the routing rule within a topic exchange is described as publish-subscribe, wherein different components can specify a discriminating function and only topics matching the discriminator are passed along. In one embodiment, there are many instances of a topic exchange 310b that are created as needed for the message service. In one embodiment, there is one topic-based exchange for every topic created in the cloud computing system. In a second embodiment, there are a set number of topics that have pre-created and persistent topic exchanges 310b.

Within one or more of the exchanges 310, it may be useful to have a queue element 315. A queue 315 is a message stream; messages sent into the stream are kept in the queue 315 until a consuming component connects to the queue and fetches the message. A queue 315 can be shared or can be exclusive. In one embodiment, queues with the same topic are shared amongst Workers subscribed to that topic.

In a typical embodiment, a queue 315 will implement a FIFO policy for messages and ensure that they are delivered in the same order that they are received. In other embodiments, however, a queue 315 may implement other policies, such as LIFO, a priority queue (highest-priority messages are delivered first), or age (oldest objects in the queue are delivered first), or other configurable delivery policies. In other embodiments, a queue 315 may or may not make any guarantees related to message delivery or message persistence.

In one embodiment, element 320 is a topic publisher. A topic publisher 320 is created, instantiated, or awakened when an RPC directed message or an RPC broadcast operation is executed; this object is instantiated and used to push a message to the message system. Every publisher connects always to the same topic-based exchange; its life-cycle is limited to the message delivery.

In one embodiment, element 330 is a direct consumer. A direct consumer 330 is created, instantiated, or awakened if an RPC directed message operation is executed; this component is instantiated and used to receive a response message from the queuing system. Every direct consumer 330 connects to a unique direct-based exchange via a unique exclusive queue, identified by a UUID or other unique name. The life-cycle of the direct consumer 330 is limited to the message delivery. In one embodiment, the exchange and queue identifiers are included the message sent by the topic publisher 320 for RPC directed message operations.

In one embodiment, elements 340 (elements 340a and 340b) are topic consumers. In one embodiment, a topic consumer 340 is created, instantiated, or awakened at system start. In a second embodiment, a topic consumer 340 is created, instantiated, or awakened when a topic is registered with the message system 300. In a third embodiment, a topic consumer 340 is created, instantiated, or awakened at the same time that a Worker or Workers are instantiated and persists as long as the associated Worker or Workers have not been destroyed. In this embodiment, the topic consumer 340 is used to receive messages from the queue and it invokes the appropriate action as defined by the Worker role. A topic consumer 340 connects to the topic-based exchange either via a shared queue or via a unique exclusive queue. In one embodiment, every Worker has two associated topic consumers 340, one that is addressed only during an RPC broadcast operations (and it connects to a shared queue whose exchange key is defined by the topic) and the other that is addressed only during an RPC directed message operations, connected to a unique queue whose with the exchange key is defined by the topic and the host.

In one embodiment, element 350 is a direct publisher. In one embodiment, a direct publisher 350 is created, instantiated, or awakened for RPC directed message operations and it is instantiated to return the message required by the request/response operation. The object connects to a direct-based exchange whose identity is dictated by the incoming message.

Turning now to FIG. 3b, one embodiment of the process of sending an RPC directed message is shown relative to the elements of the message system 300 as described relative to FIG. 3a. All elements are as described above relative to FIG. 3a unless described otherwise. At step 360, a topic publisher 320 is instantiated. At step 361, the topic publisher 320 sends a message to an exchange 310b. At step 362, a direct consumer 330 is instantiated to wait for the response message. At step 363, the message is dispatched by the exchange 310b. At step 364, the message is fetched by the topic consumer 340 dictated by the routing key (either by topic or by topic and host). At step 365, the message is passed to a Worker associated with the topic consumer 340. If needed, at step 366, a direct publisher 350 is instantiated to send a response message via the message system 300. At step 367, the direct publisher 340 sends a message to an exchange 310a. At step 368, the response message is dispatched by the exchange 310a. At step 369, the response message is fetched by the direct consumer 330 instantiated to receive the response and dictated by the routing key. At step 370, the message response is passed to the Invoker.

Turning now to FIG. 3c, one embodiment of the process of sending an RPC broadcast message is shown relative to the elements of the message system 300 as described relative to FIG. 3a. All elements are as described above relative to FIG. 3a unless described otherwise. At step 580, a topic publisher 520 is instantiated. At step 381, the topic publisher 320 sends a message to an exchange 310a. At step 382, the message is dispatched by the exchange 310b. At step 383, the message is fetched by a topic consumer 340 dictated by the routing key (either by topic or by topic and host). At step 384, the message is passed to a Worker associated with the topic consumer 340.

Figure 5:
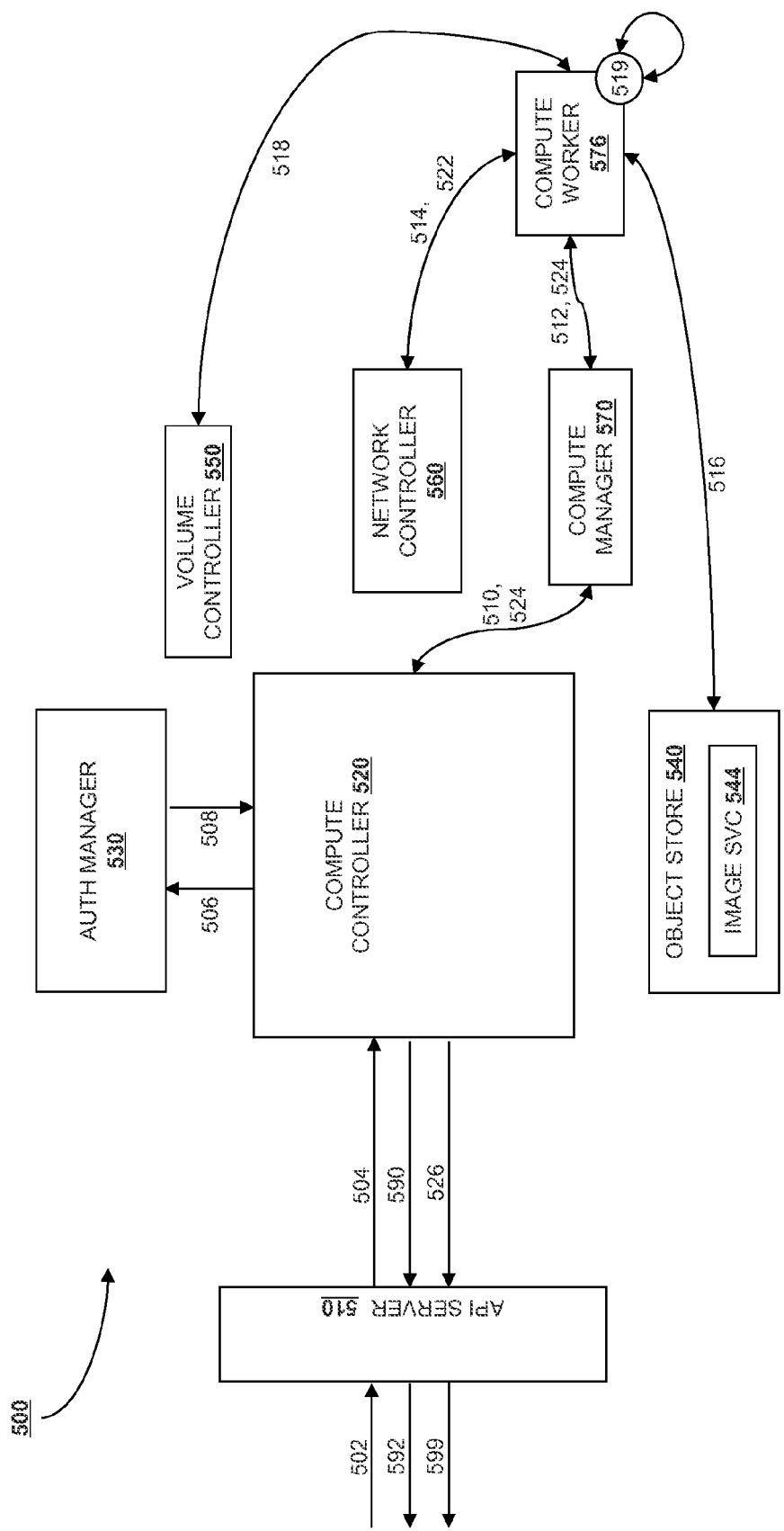
FIG. 5 shows an instantiating and launching process for virtual resources according to various embodiments.

In some embodiments, a response to an RPC broadcast message can be requested. In that case, the process follows the steps outlined relative to FIG. 3b to return a response to the Invoker. As the process of instantiating and launching a VM instance in FIG. 5 shows, requests to a distributed service or application may move through various software components, which may be running on one physical machine or may span across multiple machines and network boundaries.

Figure 4:
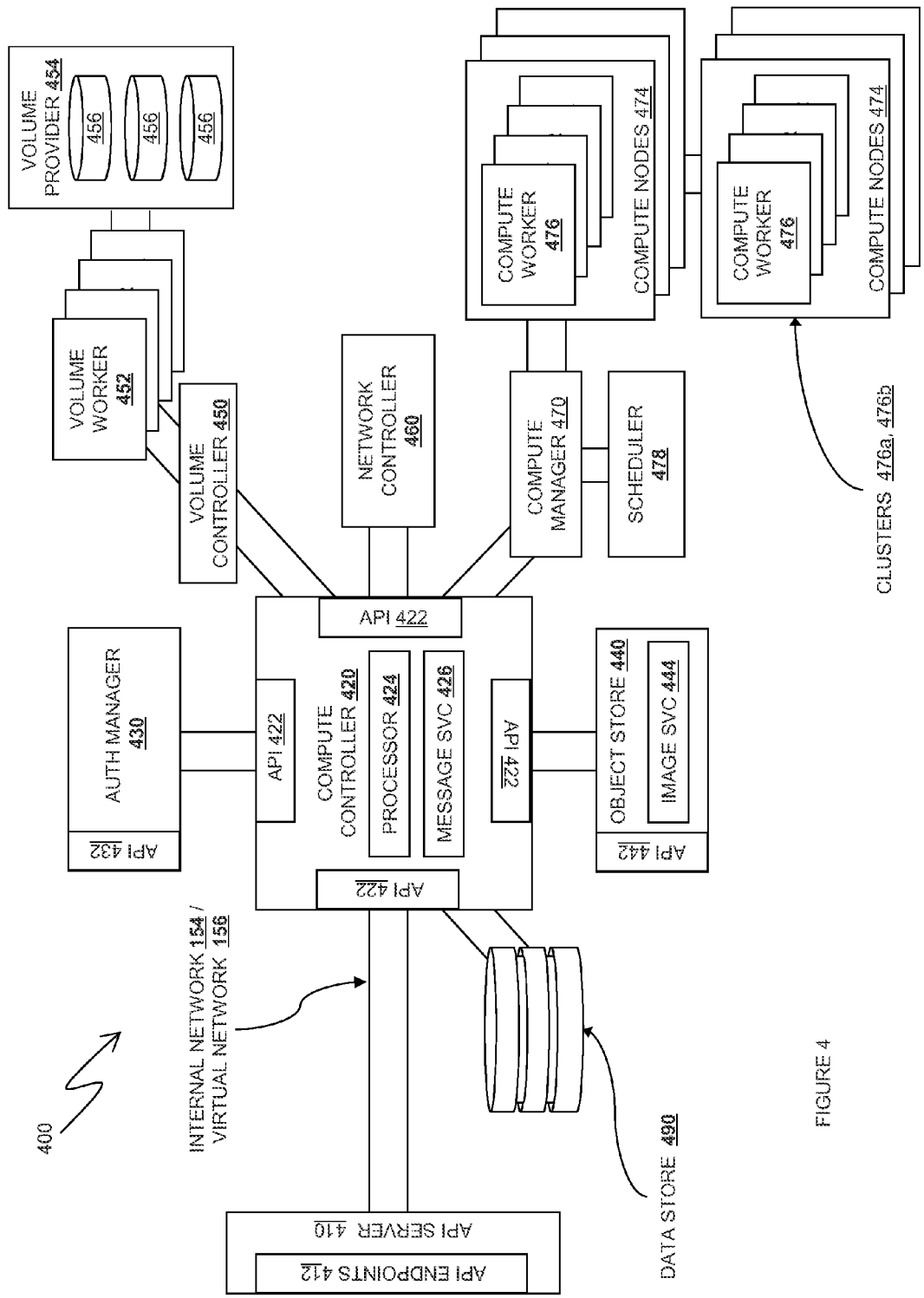
FIG. 4 shows IaaS-style computational cloud service according to various embodiments.

Turning now to FIG. 4, an IaaS-style computational cloud service (a "compute" service) is shown at 400 according to one embodiment. This is one embodiment of a cloud controller 135 with associated cloud service 140 as described relative to FIG. 1b. Except as described relative to specific embodiments, the existence of a compute service does not require or prohibit the existence of other portions of the cloud computing system 130 nor does it require or prohibit the existence of other cloud controllers 135 with other respective services 140.

To the extent that some components described relative to the compute service 400 are similar to components of the larger cloud computing system 130, those components may be shared between the cloud computing system 130 and a compute service 400, or they may be completely separate. Further, to the extent that "controllers," "nodes," "servers," "managers," "VMs," or similar terms are described relative to the compute service 400, those can be understood to comprise any of a single information processing device 210 as described relative to FIG. 2, multiple information processing devices 210, a single VM as described relative to FIG. 2, a group or cluster of VMs or information processing devices as described relative to FIG. 3. These may run on a single machine or a group of machines, but logically work together to provide the described function within the system.

In one embodiment, compute service 400 includes an API Server 410, a Compute Controller 420, an Auth Manager 430, an Object Store 440, a Volume Controller 450, a Network Controller 460, and a Compute Manager 470. These components are coupled by a communications network of the type previously described. In one embodiment, communications between various components are message-oriented, using HTTP or a messaging protocol such as AMQP, ZeroMQ, or STOMP.

Although various components are described as "calling" each other or "sending" data or messages, one embodiment makes the communications or calls between components asynchronous with callbacks that get triggered when responses are received. This allows the system to be architected in a "shared-nothing" fashion. To achieve the shared-nothing property with multiple copies of the same component, compute service 400 further includes distributed data store 490. Global state for compute service 400 is written into this store using atomic transactions when required. Requests for system state are read out of this store. In some embodiments, results are cached within controllers for short periods of time to improve performance. In various embodiments, the distributed data store 490 can be the same as, or share the same implementation as Object Store 440.

In one embodiment, the API server 410 includes external API endpoints 412. In one embodiment, the external API endpoints 412 are provided over an RPC-style system, such as CORBA, DCE/COM, SOAP, or XML-RPC. These follow the calling structure and conventions defined in their respective standards. In another embodiment, the external API endpoints 412 are basic HTTP web services following a REST pattern and identifiable via URL. Requests to read a value from a resource are mapped to HTTP GETs, requests to create resources are mapped to HTTP PUTs, requests to update values associated with a resource are mapped to HTTP POSTs, and requests to delete resources are mapped to HTTP DELETEs. In some embodiments, other REST-style verbs are also available, such as the ones associated with WebDav. In a third embodiment, the API endpoints 412 are provided via internal function calls, IPC, or a shared memory mechanism. Regardless of how the API is presented, the external API endpoints 412 are used to handle authentication, authorization, and basic command and control functions using various API interfaces. In one embodiment, the same functionality is available via multiple APIs, including APIs associated with other cloud computing systems. This enables API compatibility with multiple existing tool sets created for interaction with offerings from other vendors.

The Compute Controller 420 coordinates the interaction of the various parts of the compute service 400. In one embodiment, the various internal services that work together to provide the compute service 400, are internally decoupled by adopting a service-oriented architecture (SOA). The Compute Controller 420 serves as an internal API server, allowing the various internal controllers, managers, and other components to request and consume services from the other components. In one embodiment, all messages pass through the Compute Controller 420. In a second embodiment, the Compute Controller 420 brings up services and advertises service availability, but requests and responses go directly between the components making and serving the request. In a third embodiment, there is a hybrid model in which some services are requested through the Compute Controller 420, but the responses are provided directly from one component to another.

In one embodiment, communication to and from the Compute Controller 420 is mediated via one or more internal API endpoints 422, provided in a similar fashion to those discussed above. The internal API endpoints 422 differ from the external API endpoints 412 in that the internal API endpoints 422 advertise services only available within the overall compute service 400, whereas the external API endpoints 412 advertise services available outside the compute service 400. There may be one or more internal APIs 422 that correspond to external APIs 412, but it is expected that there will be a greater number and variety of internal API calls available from the Compute Controller 420.

In one embodiment, the Compute Controller 420 includes an instruction processor 424 for receiving and processing instructions associated with directing the compute service 400. For example, in one embodiment, responding to an API call involves making a series of coordinated internal API calls to the various services available within the compute service 400, and conditioning later API calls on the outcome or results of earlier API calls. The instruction processor 424 is the component within the Compute Controller 420 responsible for marshaling arguments, calling services, and making conditional decisions to respond appropriately to API calls.

In one embodiment, the instruction processor 424 is implemented as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor 424, running as a discrete operating environment, as a process in an active operating environment, or can be run from a low-power embedded processor. In a second embodiment, the instruction processor 424 takes the form of a series of interoperating but discrete components, some or all of which may be implemented as software programs. In another embodiment, the instruction processor 424 is a discrete component, using a small amount of flash and a low power processor, such as a low-power ARM processor. In a further embodiment, the instruction processor includes a rule engine as a submodule as described herein.

In one embodiment, the Compute Controller 420 includes a message queue as provided by message service 426. In accordance with the service-oriented architecture described above, the various functions within the compute service 400 are isolated into discrete internal services that communicate with each other by passing data in a well-defined, shared format, or by coordinating an activity between two or more services. In one embodiment, this is done using a message queue as provided by message service 426. The message service 426 brokers the interactions between the various services inside and outside the Compute Service 400.

In one embodiment, the message service 426 is implemented similarly to the message service described relative to FIGS. 3a-3c. The message service 426 may use the message service 110 directly, with a set of unique exchanges, or may use a similarly configured but separate service.

The Auth Manager 430 provides services for authenticating and managing user, account, role, project, group, quota, and security group information for the compute service 400. In a first embodiment, every call is necessarily associated with an authenticated and authorized entity within the system, and so is or can be checked before any action is taken. In another embodiment, internal messages are assumed to be authorized, but all messages originating from outside the service are suspect. In this embodiment, the Auth Manager checks the keys provided associated with each call received over external API endpoints 412 and terminates and/or logs any call that appears to come from an unauthenticated or unauthorized source. In a third embodiment, the Auth Manager 430 is also used for providing resource-specific information such as security groups, but the internal API calls for that information are assumed to be authorized. External calls are still checked for proper authentication and authorization. Other schemes for authentication and authorization can be implemented by flagging certain API calls as needing verification by the Auth Manager 430, and others as needing no verification.

In one embodiment, external communication to and from the Auth Manager 430 is mediated via one or more authentication and authorization API endpoints 632, provided in a similar fashion to those discussed above. The authentication and authorization API endpoints 432 differ from the external API endpoints 612 in that the authentication and authorization API endpoints 432 are only used for managing users, resources, projects, groups, and rules associated with those entities, such as security groups, RBAC roles, etc. In another embodiment, the authentication and authorization API endpoints 432 are provided as a subset of external API endpoints 412.

In one embodiment, the Auth Manager 430 includes rules processor 434 for processing the rules associated with the different portions of the compute service 400. In one embodiment, this is implemented in a similar fashion to the instruction processor 424 described above.

The Object Store 440 provides redundant, scalable object storage capacity for arbitrary data used by other portions of the compute service 400. At its simplest, the Object Store 440 can be implemented one or more block devices exported over the network. In a second embodiment, the Object Store 440 is implemented as a structured, and possibly distributed data organization system. Examples include relational database systems—both standalone and clustered—as well as non-relational structured data storage systems like MongoDB, Apache Cassandra, or Redis. In a third embodiment, the Object Store 440 is implemented as a redundant, eventually consistent, fully distributed data storage service.

In one embodiment, external communication to and from the Object Store 440 is mediated via one or more object storage API endpoints 442, provided in a similar fashion to those discussed above. In one embodiment, the object storage API endpoints 442 are internal APIs only. In a second embodiment, the Object Store 440 is provided by a separate cloud service 130, so the "internal" API used for compute service 400 is the same as the external API provided by the object storage service itself.

In one embodiment, the Object Store 440 includes an Image Service 444. The Image Service 444 is a lookup and retrieval system for virtual machine images. In one embodiment, various virtual machine images can be associated with a unique project, group, user, or name and stored in the Object Store 440 under an appropriate key. In this fashion multiple different virtual machine image files can be provided and programmatically loaded by the compute service 400.

The Volume Controller 450 coordinates the provision of block devices for use and attachment to virtual machines. In one embodiment, the Volume Controller 450 includes Volume Workers 452. The Volume Workers 452 are implemented as unique virtual machines, processes, or threads of control that interact with one or more backend volume providers 454 to create, update, delete, manage, and attach one or more volumes 456 to a requesting VM.

In a first embodiment, the Volume Controller 450 is implemented using a SAN that provides a sharable, network-exported block device that is available to one or more VMs, using a network block protocol such as iSCSI. In this embodiment, the Volume Workers 452 interact with the SAN to manage and iSCSI storage to manage LVM-based instance volumes, stored on one or more smart disks or independent processing devices that act as volume providers 454 using their embedded storage 456. In a second embodiment, disk volumes 456 are stored in the Object Store 440 as image files under appropriate keys. The Volume Controller 450 interacts with the Object Store 440 to retrieve a disk volume 456 and place it within an appropriate logical container on the same information processing system 440 that contains the requesting VM. An instruction processing module acting in concert with the instruction processor and hypervisor on the information processing system 240 acts as the volume provider 454, managing, mounting, and unmounting the volume 456 on the requesting VM. In a further embodiment, the same volume 456 may be mounted on two or more VMs, and a block-level replication facility may be used to synchronize changes that occur in multiple places. In a third embodiment, the Volume Controller 450 acts as a block-device proxy for the Object Store 440, and directly exports a view of one or more portions of the Object Store 440 as a volume. In this embodiment, the volumes are simply views onto portions of the Object Store 440, and the Volume Workers 454 are part of the internal implementation of the Object Store 440.

In one embodiment, the Network Controller 460 manages the networking resources for VM hosts managed by the compute manager 470. Messages received by Network Controller 460 are interpreted and acted upon to create, update, and manage network resources for compute nodes within the compute service, such as allocating fixed IP addresses, configuring VLANs for projects or groups, or configuring networks for compute nodes.

In one embodiment, the Network Controller 460 may use a shared cloud controller directly, with a set of unique addresses, identifiers, and routing rules, or may use a similarly configured but separate service.

In one embodiment, the Compute Manager 470 manages computing instances for use by API users using the compute service 400. In one embodiment, the Compute Manager 470 is coupled to a plurality of resource pools 472, each of which includes one or more compute nodes 474. Each compute node 474 is a virtual machine management system as described relative to FIG. 3 and includes a compute worker 476, a module working in conjunction with the hypervisor and instruction processor to create, administer, and destroy multiple user- or system-defined logical containers and operating environments—VMs—according to requests received through the API. In various embodiments, the pools of compute nodes may be organized into clusters, such as clusters 476a and 476b. In one embodiment, each resource pool 472 is physically located in one or more data centers in one or more different locations. In another embodiment, resource pools have different physical or software resources, such as different available hardware, higher-throughput network connections, or lower latency to a particular location.

In one embodiment, the Compute Manager 470 allocates VM images to particular compute nodes 474 via a Scheduler 478. The Scheduler 478 is a matching service; requests for the creation of new VM instances come in and the most applicable Compute nodes 474 are selected from the pool of potential candidates. In one embodiment, the Scheduler 478 selects a compute node 474 using a random algorithm. Because the node is chosen randomly, the load on any particular node tends to be non-coupled and the load across all resource pools tends to stay relatively even.

In a second embodiment, a smart scheduler 478 is used. A smart scheduler analyzes the capabilities associated with a particular resource pool 472 and its component services to make informed decisions on where a new instance should be created. When making this decision it consults not only all the Compute nodes across the resource pools 472 until the ideal host is found.

In a third embodiment, a distributed scheduler 478 is used. A distributed scheduler is designed to coordinate the creation of instances across multiple compute services 400. Not only does the distributed scheduler 478 analyze the capabilities associated with the resource pools 472 available to the current compute service 400, it also recursively consults the schedulers of any linked compute services until the ideal host is found.

In one embodiment, either the smart scheduler or the distributed scheduler is implemented using a rules engine 479 (not shown) and a series of associated rules regarding costs and weights associated with desired compute node characteristics. When deciding where to place an Instance, rules engine 479 compares a Weighted Cost for each node. In one embodiment, the Weighting is just the sum of the total Costs. In a second embodiment, a Weighting is calculated using an exponential or polynomial algorithm. In the simplest embodiment, costs are nothing more than integers along a fixed scale, although costs can also be represented by floating point numbers, vectors, or matrices. Costs are computed by looking at the various Capabilities of the available node relative to the specifications of the Instance being requested. The costs are calculated so that a "good" match has lower cost than a "bad" match, where the relative goodness of a match is determined by how closely the available resources match the requested specifications.

In one embodiment, specifications can be hierarchical, and can include both hard and soft constraints. A hard constraint is a constraint is a constraint that cannot be violated and have an acceptable response. This can be implemented by having hard constraints be modeled as infinite-cost requirements. A soft constraint is a constraint that is preferable, but not required. Different soft constraints can have different weights, so that fulfilling one soft constraint may be more cost-effective than another. Further, constraints can take on a range of values, where a good match can be found where the available resource is close, but not identical, to the requested specification. Constraints may also be conditional, such that constraint A is a hard constraint or high-cost constraint if Constraint B is also fulfilled, but can be low-cost if Constraint C is fulfilled.

As implemented in one embodiment, the constraints are implemented as a series of rules with associated cost functions. These rules can be abstract, such as preferring nodes that don't already have an existing instance from the same project or group. Other constraints (hard or soft), may include: a node with available GPU hardware; a node with an available network connection over 100 Mbps; a node that can run Windows instances; a node in a particular geographic location, etc.

When evaluating the cost to place a VM instance on a particular node, the constraints are computed to select the group of possible nodes, and then a weight is computed for each available node and for each requested instance. This allows large requests to have dynamic weighting; if 1000 instances are requested, the consumed resources on each node are "virtually" depleted so the Cost can change accordingly.

Turning now to FIG. 5, a diagram showing one embodiment of the process of instantiating and launching a VM instance is shown as diagram 500. At time 502, the API Server 510 receives a request to create and run an instance with the appropriate arguments. In one embodiment, this is done by using a command-line tool that issues arguments to the API server 510. In a second embodiment, this is done by sending a message to the API Server 510. In one embodiment, the API to create and run the instance includes arguments specifying a resource type, a resource image, and control arguments. A further embodiment includes requester information and is signed and/or encrypted for security and privacy. At time 504, API server 510 accepts the message, examines it for API compliance, and relays a message to Compute Controller 520, including the information needed to service the request. In an embodiment in which user information accompanies the request, either explicitly or implicitly via a signing and/or encrypting key or certificate, the Compute Controller 520 sends a message to Auth Manager 530 to authenticate and authorize the request at time 506 and Auth Manager 530 sends back a response to Compute Controller 520 indicating whether the request is allowable at time 508. If the request is allowable, a message is sent to the Compute Manager 570 to instantiate the requested resource at time 510. At time 512, the Compute Manager selects a Compute Worker 576 and sends a message to the selected Worker to instantiate the requested resource. At time 514, Compute Worker identifies and interacts with Network Controller 560 to get a proper VLAN and IP address. At time 516, the selected Worker 576 interacts with the Object Store 540 and/or the Image Service 544 to locate and retrieve an image corresponding to the requested resource. If requested via the API, or used in an embodiment in which configuration information is included on a mountable volume, the selected Worker interacts with the Volume Controller 550 at time 518 to locate and retrieve a volume for the to-be-instantiated resource. At time 519, the selected Worker 576 uses the available virtualization infrastructure to instantiate the resource, mount any volumes, and perform appropriate configuration. At time 522, selected Worker 556 interacts with Network Controller 560 to configure routing. At time 524, a message is sent back to the Compute Controller 520 via the Compute Manager 550 indicating success and providing necessary operational details relating to the new resource. At time 526, a message is sent back to the API Server 526 with the results of the operation as a whole. At time 599, the API-specified response to the original command is provided from the API Server 510 back to the originally requesting entity. If at any time a requested operation cannot be performed, then an error is returned to the API Server at time 590 and the API-specified response to the original command is provided from the API server at time 592. For example, an error can be returned if a request is not allowable at time 508, if a VLAN cannot be created or an IP allocated at time 514, if an image cannot be found or transferred at time 516, etc. Such errors may be one potential source of mistakes or inconsistencies in periodic system status notifications discussed below.

Having described an example of a distributed application and operation within a distributed network system, various embodiments of methods and systems for verification of records of system change events in a distributed network system are described with references to FIGS. 6-13. As used herein, a distributed network system may relate to one or more services and components, and in particular cloud services. Various embodiments of the methods and systems disclosed herein may permit verification of records of system change events in a distributed network system providing cloud services.

Figure 6:
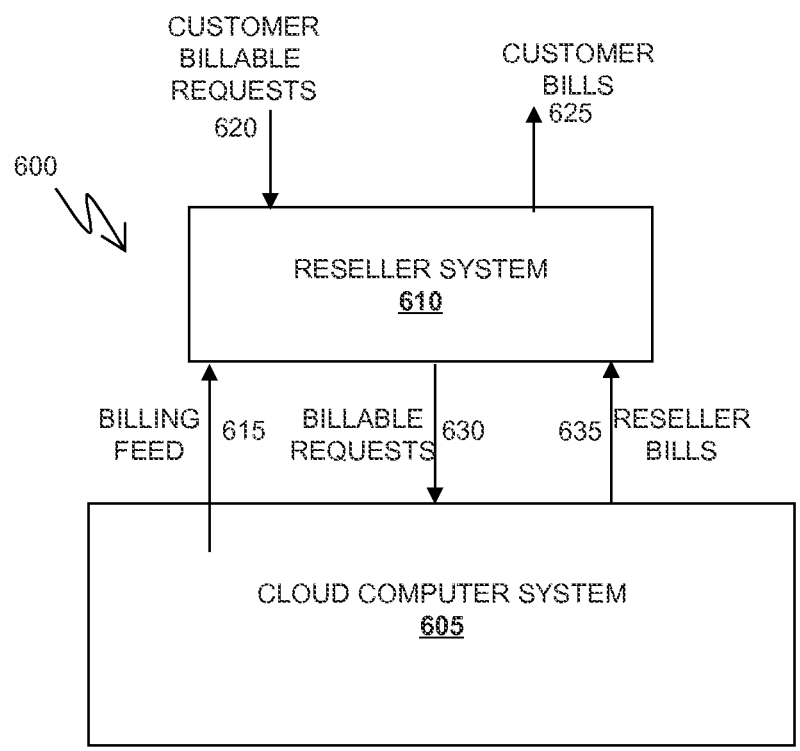
FIG. 6 illustrates a graphical representation of a system for reselling resources of a distributed network system.

FIG. 6 illustrates a simplified diagram of a system for reselling resources of a distributed network system, and in particular a cloud computing system. System 600 includes cloud computing system 605 (e.g., cloud computing system 130) and a reseller system 610. According to one embodiment, cloud computer system 605 may provide cloud services to reseller system 610 and a billing feed 615. Billing feed 615 may include one or more potential billable elements for tracking usage. Billing feed 615 may provide data based on one or more models for tracking and billing usage.

Reselling system 610 may be configured as an intermediary for selling and/or providing services of cloud computing system 605 to one or more entities, such as customers. Services by reseller system 610 may be based on requests, such as customer billable request 620. Based on received requests for cloud services, reseller system may generate one or more customer bills 625. Similarly, reseller system may generate one or more requests, such as billable requests 630 for cloud services. Based on requested services buy reseller system 610, cloud computing system 605 may generate one or more reseller bills 635. According to one embodiment, customer bills 625 generated by reseller system 610 may be based on one or more of billing feed 615 and service fees, such as reseller bills 635. It is advantageous to verify the accuracy of records upon which the reseller bills 635 and customer bills 625 are based according to the present embodiments.

Figure 7:
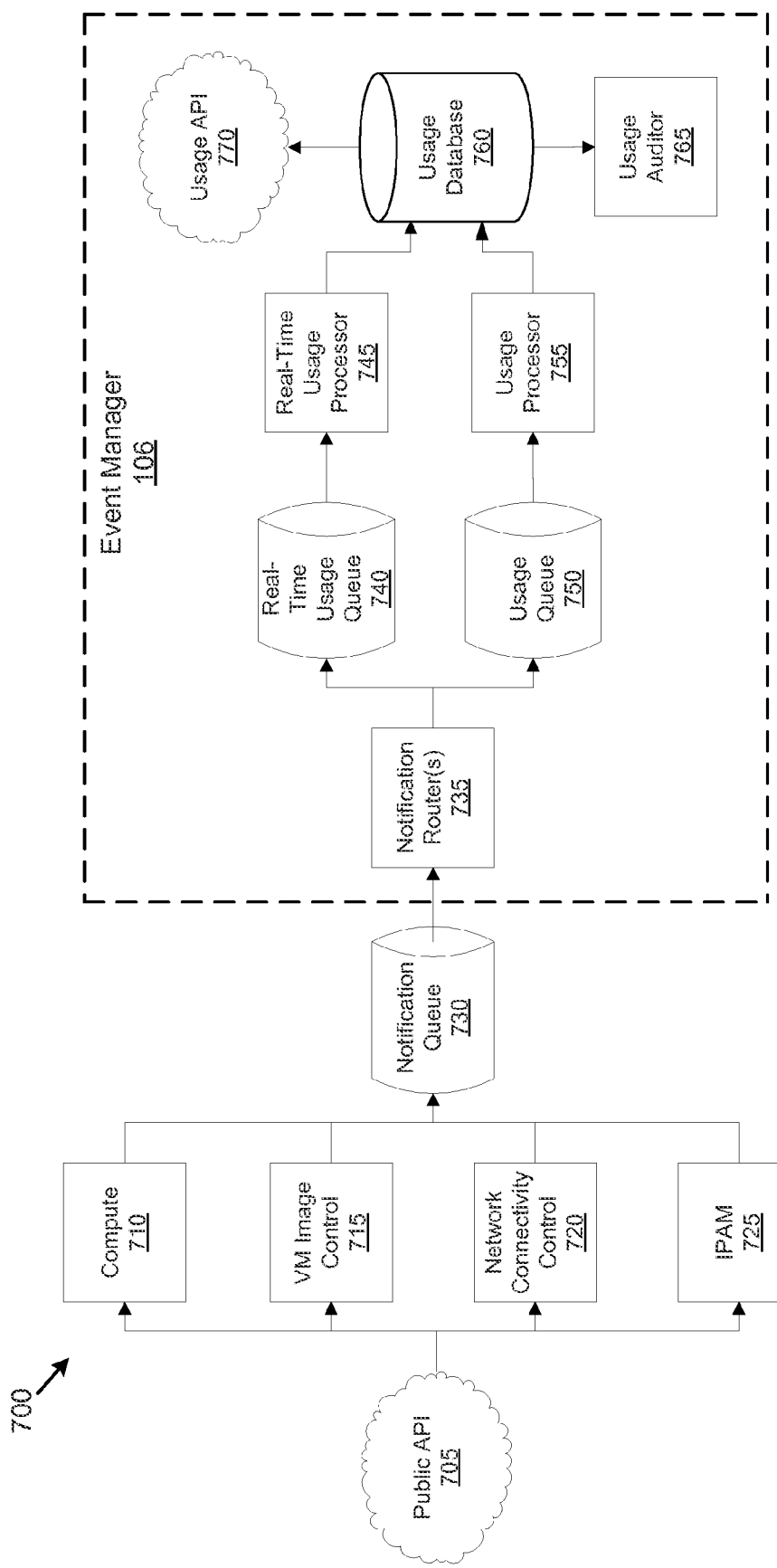
FIG. 7 is a schematic block diagram illustrating one embodiment of an apparatus for tracking and verifying records of system change events in a distributed network system.

FIG. 7 is a schematic block diagram illustrating one embodiment of an apparatus 700 for tracking and verifying records of system change events in a distributed network system providing cloud services. A public API 705 may receive a system update request from a remote user. For example, the public API 705 may receive a declarative request to or command for changes in backend storage, computation, and scaling resources provided by the cloud. Depending upon the type of request received, one of the compute component 710, the VM image control component 715, the network connectivity control component 720 or the IP Address Management (IPAM) component 725 may handle processing of the API request. For example, the compute component 710 may handle requests for new instances of objects on the cloud, the VM image control component 715 may handle requests for new VM images on the cloud, the network connectivity control component 720 may handle requests for establishing new sub-networks within the cloud, and the IPAM component 725 may handle requests for new IP addresses. One example of a compute component 710 is Openstack™ Nova™. An example of VM image control component 715 is Openstack™ Glance™. An example of network connectivity control component 720 is Openstack™ Quantum™. Additionally, an example of IPAM component 725 is Openstack™

Melange™. "OpenStack: Install and Deploy Manual," Essex (2012) (available at http://docs.openstack.org) describes the functionality of these examples, and is incorporated herein by reference, in entirety. These examples of components 710-725 are merely one, non-limiting, embodiment of components that may be implemented in the software stack for implementing cloud services. One of ordinary skill in the art will recognize that these components may be used in combination or may be substituted with other components for fulfilling the API request.

Regardless of the component 710-725 used to fulfill the request received by the public API 705, a notification is generated and sent to notification queue 730. Event manager 106 may then observe messages or notifications associated with the request received by the public API. In one embodiment, event manager 106 may directly access notification queue 730. Alternatively, event manager 106 may observe the notifications as they leave notification queue 730 and are communicated between controllers/components by message service 110. In one embodiment, notification queue 730 may be integrated with message service 110. In another embodiment, notification queue 730 may be maintained separate from message service 110.

In one embodiment, notification router 735 may communicate messages from notification queue 730. In the depicted embodiment, notification router 735 is illustrated as an integrated component with event manager 106. In an alternative embodiment, notification router 735 may be integrated with message service 110. In still a further embodiment, notification router 735 may be coupled to message service 110 for the purpose of observing messages communicated between controllers/components by message service 110. Notification router 735 may communicate messages/notifications to real-time usage queue 740 and also to usage queue 750.

The messages in usage queue 750 may be used by usage processor 755 to generate a periodic system status message. In one embodiment, the periodic system status messages are generated on a daily basis. One of ordinary skill in the art will recognize that other embodiments may exist, where the period of generating the periodic system status messages is different. For example, the periodic system status messages may be generated hourly, weekly, bi-weekly, monthly, quarterly, yearly, etc. In alternative embodiments, the usage processor 755 may be implement in a distributed fashion, where each of a plurality of hosts in the distributed network system includes a process for generating a host-specific periodic system status message and communicate that to usage database 760 for aggregation or for independent analysis.

Real-time usage processor 745 may collect usage messages from real-time usage queue 740 and construct a record of the state of the object in response to the update messages. The record may be maintained in real-time, or near real-time, as compared with the periodic system status messages. In one embodiment, the record may be chronologically arranged, for example in a timeline, such that sources of errors in the periodic system status message can be more effectively identified.

In one embodiment, real-time usage processor 745 may store the record in usage database 760. In one embodiment, an updated record may be stored in the usage database 760 each time the real-time usage processor 745 updates the record. Additionally, the usage processor 755 may store the periodic system status message in usage database 760. In one embodiment, both the record and the periodic system status message may be stored in the same usage database 760. In another embodiment, the record may be stored in separate usage databases.

The usage auditor 765 may access both the record of the state of the object and the most recent periodic system status message from the usage database 760. The usage auditor 765 may then compare the state of the object as described in the periodic system status message with the expected state as defined by the record at the time the periodic usage message was generated. In a further embodiment, the usage auditor 765 may determine the state of the object in the record based upon a timestamp included with the periodic system status message. For example, the periodic system status message may include a specific date and time, and the usage auditor 765 may use that timestamp to align the periodic system status message with the proper point in the record for verification that the periodic system status message is correct.

In one embodiment, a usage API 770 may also be provided. For example, in the system of FIG. 6, reseller system 610 may access usage API 770 to obtain verified usage data or system status information for billing. Alternatively, one or more of the system processors, utilities, management components, auditing components, or the like may access usage API 770 to obtain verified usage data.

Figure 8:
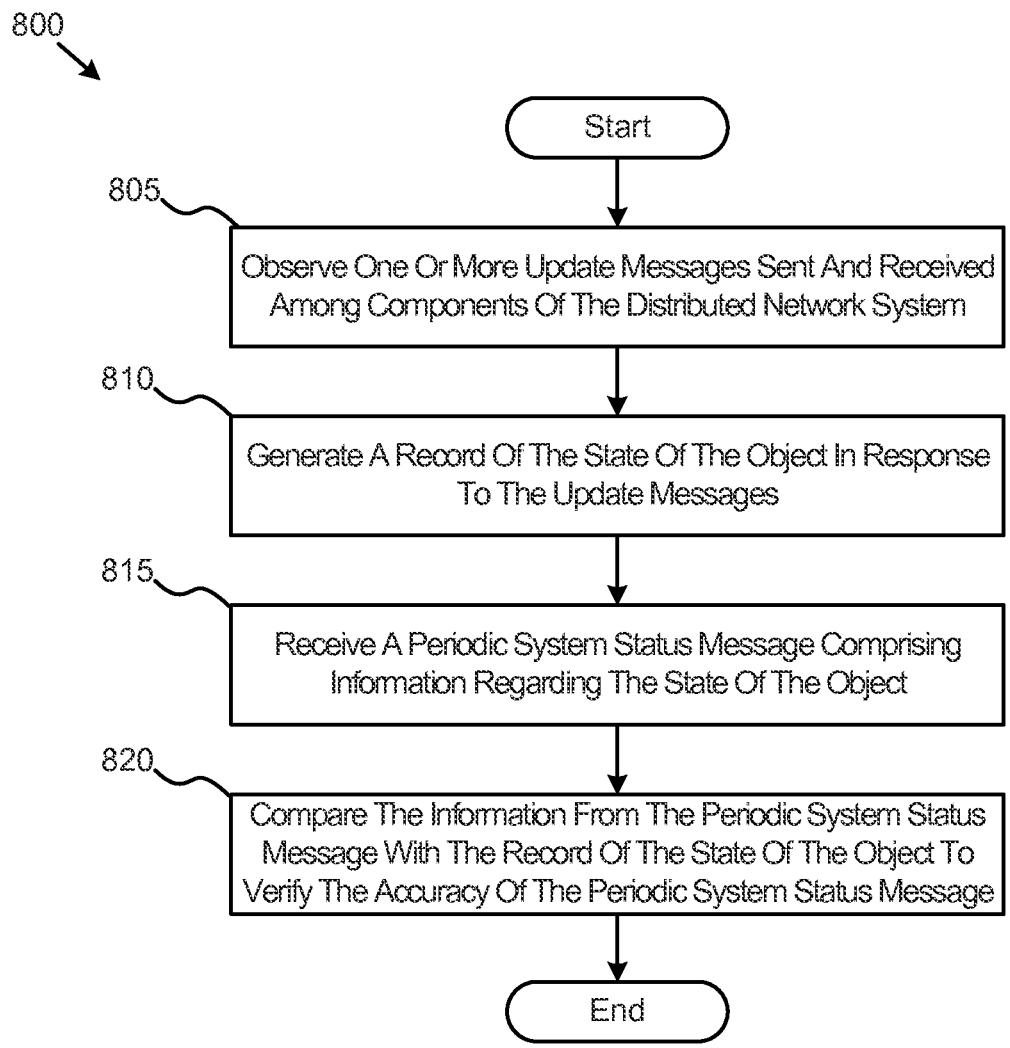
FIG. 8 is a flowchart diagram illustrating one embodiment of a method for tracking and verifying records of system change events in a distributed network system.

FIG. 8 illustrates an embodiment of a method 800 for tracking and verifying records of system change events in a distributed network system providing cloud services. The update messages may include information associated with a state of an object on the distributed network system. In one embodiment, the method starts when the event manager 106 observes one or more update messages set and/or received among components of the distributed network system 100 as shown at block 805. For example, in one embodiment, the notification router 735 may send notification messages from notification queue 730 to the real-time usage queue 740 and to the periodic usage queue 750.

The method 800 continues at block 810 when event manager 106 generates a record of the state of the object in response to the update messages. For example, the real-time usage processor 745 may generate 810 the record of the state of the object and pass the record to the usage database 760.

At block 815, the method 800 also includes receiving a periodic system status message comprising information regarding the state of the object. For example, the usage auditor 765 may receive the periodic system status message from the usage database 760. In on embodiment, the usage auditor 765 may be configured to query the usage database 760 at a scheduled and regular interval. For example, the usage auditor 765 may query the usage database 760 daily at a predetermined time of day. The usage processor 755 may be configured to generate and store the periodic system status message in the usage database 760.

The method 800 may also include comparing the information from the periodic system status message with the record of the state of the object to verify the accuracy of the periodic system status message as shown at block 820. The usage auditor 765 may perform the comparison upon receiving both the record and the periodic system status message. For example, the usage auditor 765 may compare object properties, including processing properties, memory properties, data storage properties, network access properties, and various other properties associated with a VM. In other embodiments, usage auditor 765 may compare object properties such as a number of images associated with an account, a volume of data stored in a data storage object, and the like. On of ordinary skill in the art will recognize additional object properties associated with various system objects that may be verified. In one embodiment, the usage auditor 765 compares the properties described in the periodic system status message with expected values for those properties based on the record of system change events in the distributed network system. In a further embodiment, the usage auditor 765 may identify an error or time of error in response to a discrepancy between the information in the periodic system status message and the time associated with the discrepancy in the record.

Figure 9:
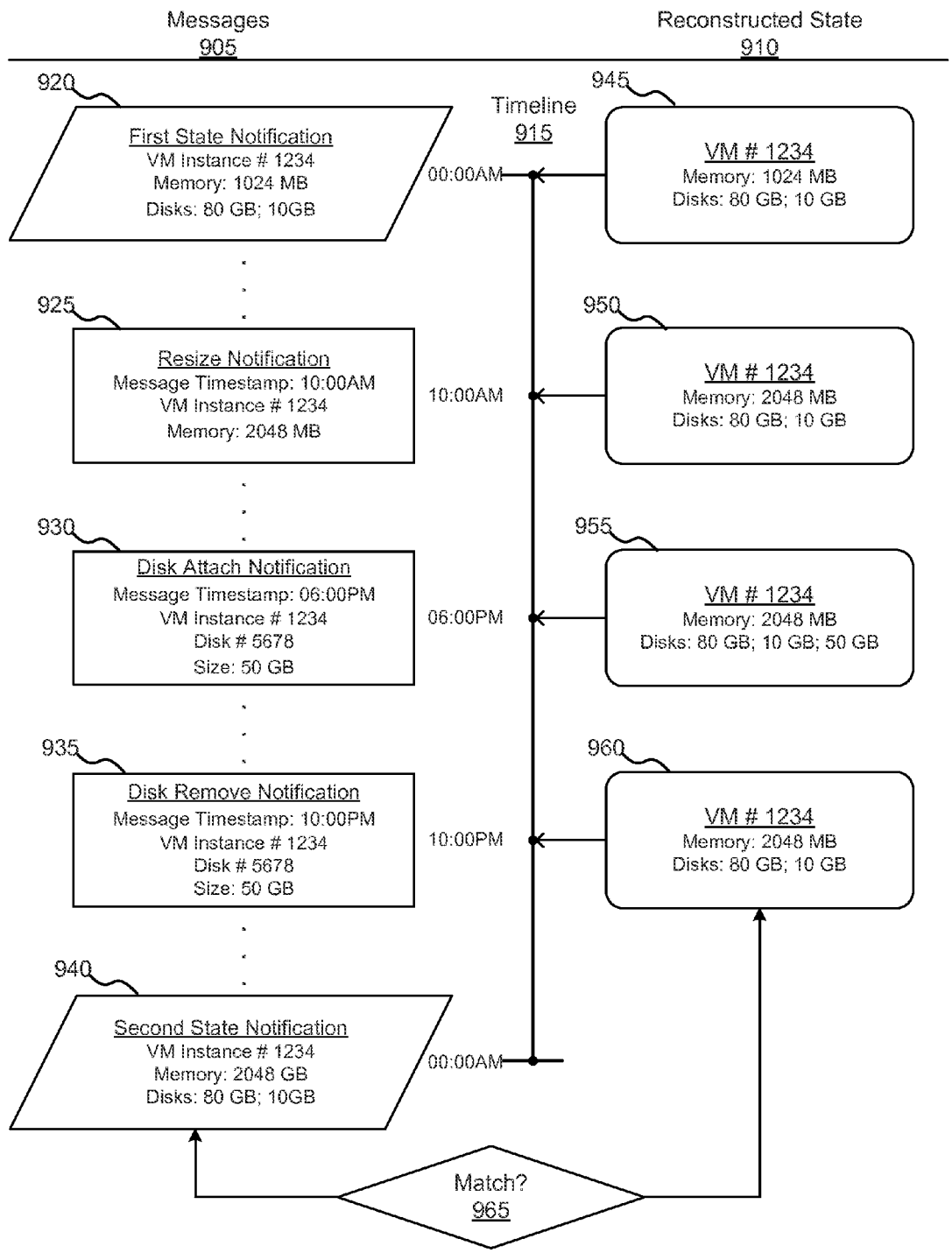
FIG. 9 shows an embodiment of a method for constructing a state tracking timeline in response to system update messages.

FIG. 9 illustrates one embodiment of a process for generating a record of system change events in a distributed network system. The diagram shows embodiments of change event messages 905 observed by the event manager 106 on the left and corresponding record updates shown as reconstructed state 910 on the right. In one embodiment, the reconstructed state 910 may be associated with a timeline 915.

In one embodiment, the event manager 106 may receive a first state notification 920 that includes information regarding properties of a VM instance. The first state notification 920 may be one embodiment of a periodic system status message. In this embodiment, the VM instance is given an identification number "1234" for tracking purposes. The properties included in this embodiment of a state notification 920 include a memory volume and a listing of disks with associated disk volume. One of ordinary skill will recognize that other properties associated with VM #1234 may be included in first state notification 920, including processing bandwidth or number of processing cores associated with VM #1234, network access bandwidth or number of Network Interface Cards (NICs) associated with VM #1234, and the like.

First state notification 920 may be used as a starting point for generating reconstructed state 910. Reconstructed state 910 is one embodiment of a record of system change events in a distributed network system. In one embodiment, a first reconstructed state record 945 is generated in response to the first state notification 920. The object properties described in the first state notification 920 are included in record 945, and record 945 is associated with the time line at a time that the first state notification is received (i.e., 00:00 AM in this example).

In one embodiment, first state notification 920 may form a starting point for reconstructed state 910. In other embodiments, for example where first state notification 920 is not available, reconstructed state 910 may be generated in response to system update messages, without the benefit of knowing an initial system state.

In the example described in FIG. 9, event manager 106 observes a VM resize notification 925. Resize notification 925 may be observed in response to, for example, a memory resize request received from public API 705. In this embodiment, the resize notification 925 indicates that the memory allocation associated with VM #1234 has been changes from 1024 MB to 2048 MB. Accordingly, reconstructed state 1010 may be updated at block 950 to show the updated system state, which now includes 2048 MB of memory. Block 950 may be associated with the timeline 915 at the time corresponding to the timestamp in resize notification 925, which is 10:00 AM in this embodiment.

Similarly, at 06:00 PM, event manager 106 may observe a disk attach notification 930. Disk attach notification 930 may indicated that a new disk with a size of 50 GB has been associated with VM #1234. Accordingly, at block 955, reconstructed state 910 is updated to include the original 80 GB and 10 GB disks, as well as a new 50 GB disk. In one embodiment, block 955 may be associated with the timeline 1015 at the time indicated by the time stamp in disk attach notification 930, which is 06:00 PM in this example.

If it turns out that the customer changes his mind about adding the new 50 GB disk, or if a system error occurred, or for a variety of other reasons, the newly allocated 50 GB disk may be removed and a disk remove notification 1035 may be observed by event manager 106. Accordingly, reconstructed state 910 may be updated at block 1060 to remove the 50 GB disk, leaving only the 80 GB disk and the 10 GB disk originally described in first state notification 1020.

In one embodiment, a second state notification 940 may be issued at the end of the day or at the beginning of the next day. The second state notification 940 may be generated by usage processor 755 and stored in usage database 760. Similarly, the reconstructed state 910 as reflected in record 960 may be stored by real-time usage processor 745 into usage database 760. The usage auditor 765 may then receive both the second state notification 940 and the record 960 and compare at block 965 to determine whether the second state notification 940 matches record 960. If the second state notification 940 matches record 960, then the second state notification 1040 is verified and the process repeats for a new day based upon the information in the second state notification 940. If, however, the information in second state notification 940 does not match the information in record 960, then an error is identified.

In one embodiment, usage auditor 765 may generate an alarm, alert, or electronic notification that an error was identified. Alternatively, usage auditor 765 may trigger another component of event manager 106 to generate the alarm, alert, or other electronic notification. Embodiments of alarms, alerts, or electronic notifications include emails, text messages, blinking lights, sirens or sounds, log records, data tags or flags, etc. One of ordinary skill in the art will recognize a variety of alarms, alerts, or electronic notifications that may be suitable for use with the present embodiments.

Figure 10:
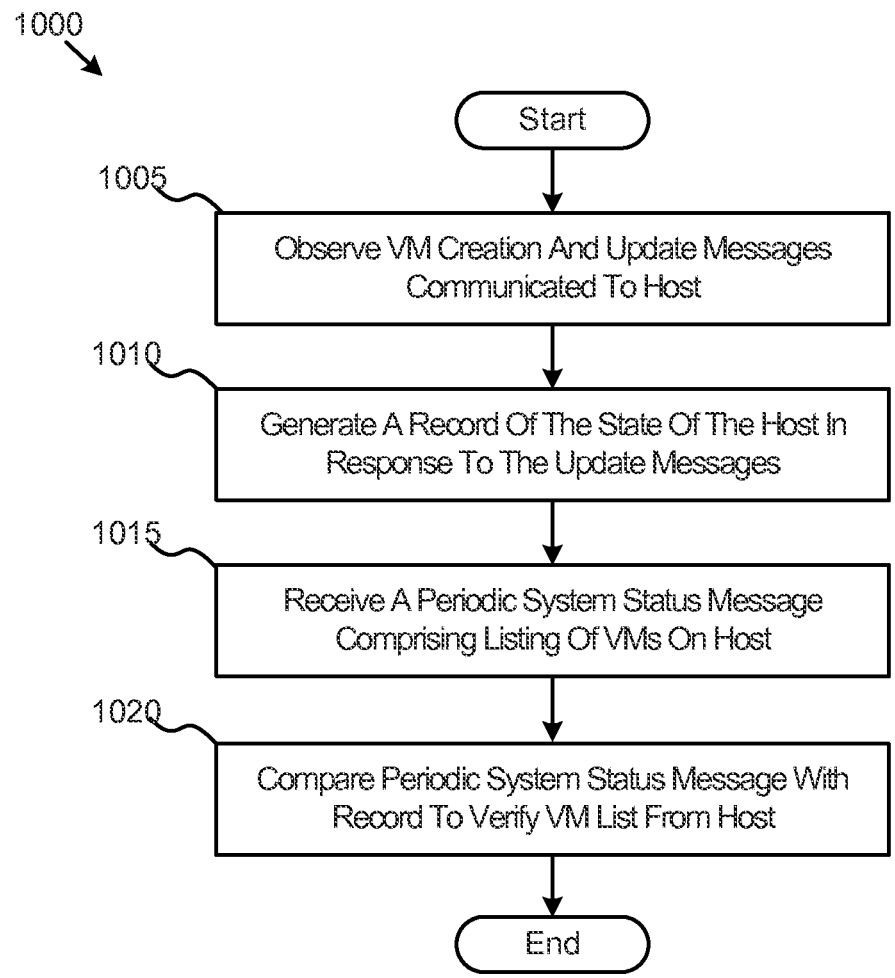
FIG. 10 is a flowchart diagram illustrating another embodiment of a method for tracking and verifying records of system change events in a distributed network system.

FIG. 10 illustrates another method for tracking and verifying periodic system status messages. In this embodiment, the object may be a physical host which is configured to host a plurality of VMs. In an embodiment, a process on the physical host may generate the periodic system status messages. One or more messages describing updates to the host may be communicated by messaging service 110. In one embodiment, the event manager 106 may observe one or more VM creation and/or update messages communicated to/from the host as illustrated at block 1005. The method 1000 may further include generating a record of the state of the host in response to the update messages as shown at block 1010. In one embodiment, the process of generating the record may be the same or similar to the process described in FIG. 9. The method 1000 may also include receiving a periodic system status message comprising a list of VMs on the host at block 1015. The event manager 106 may then compare, at block 1020, the periodic system status message with the record to verify the VM list from the host.

Such an embodiment may allow a system administrator to ensure that there are no orphaned VMs on the host. Orphaned VMs may reside on the host and consume valuable host resources, but may not be associated with any user accounts. In one embodiment, the periodic system update message may, for example, include a list of ten VMs on the host. In reality, however, the record may show that there are in fact fifteen VMs consuming system resources on the host. Such errors may occur for various reasons, including coding glitches, communication errors, VM deletion process failures, etc.

Figure 11:
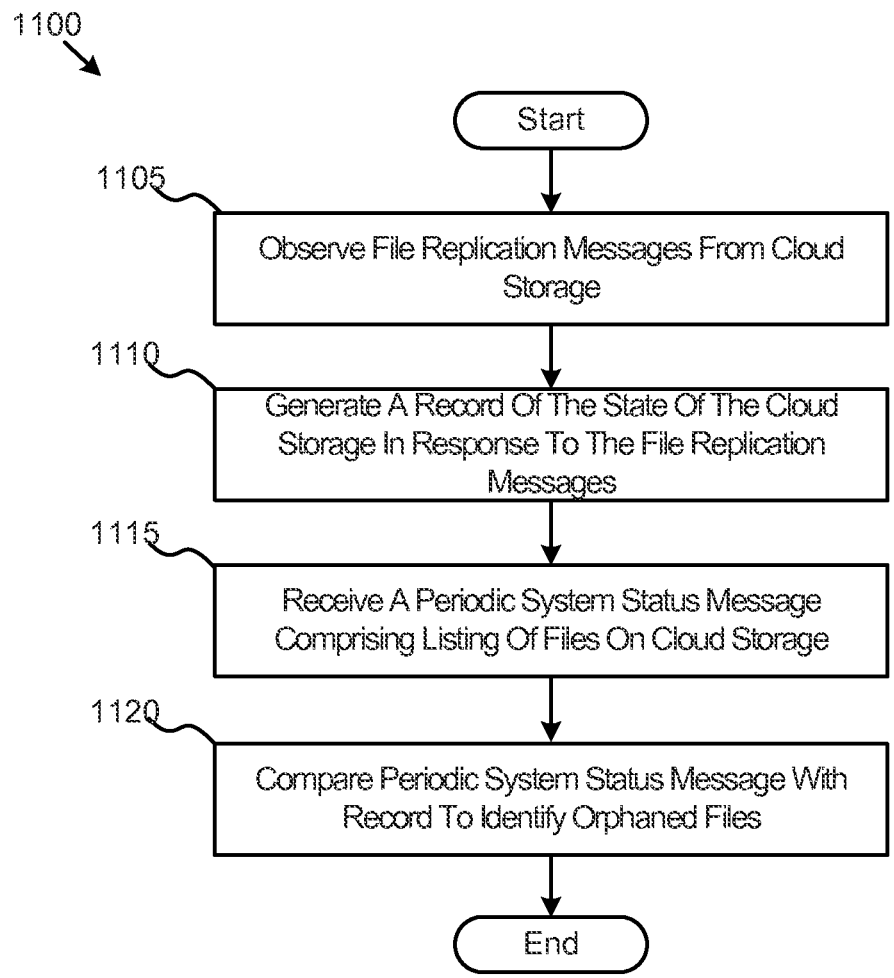
FIG. 11 is a flowchart diagram illustrating another embodiment of a method for tracking and verifying records of system change events in a distributed network system.

FIG. 11 illustrates another embodiment of a method 1100 for verifying periodic system status messages. The method of FIG. 11 may also be performed, at least in part, by event manager 106. In the embodiment described in FIG. 11, the method 1100 includes observing one or more file replication messages associated with a cloud storage service as shown at block 1105. The method 1100 may further include generating a record of the state of the cloud storage in response to the file replication messages at block 1110. For example, the real-time usage processor may maintain a list of files which are being actively replicated on the cloud storage in response to the file replication messages. The method 1100 may also include receiving a periodic system status message comprising a list of files on the cloud storage as shown at block 1115. At block 1120, the periodic system status message may be compared with the record to verify the accuracy of the periodic system status message and to identify any files that may have been orphaned during the period.

Orphaned files may become orphaned when they are no longer associated with a user account. Orphaned files are problematic because they continue to use system resources, but the cloud storage provider can no longer bill for maintaining them. A file may become orphaned through various software or process errors or glitches.

Figure 12:
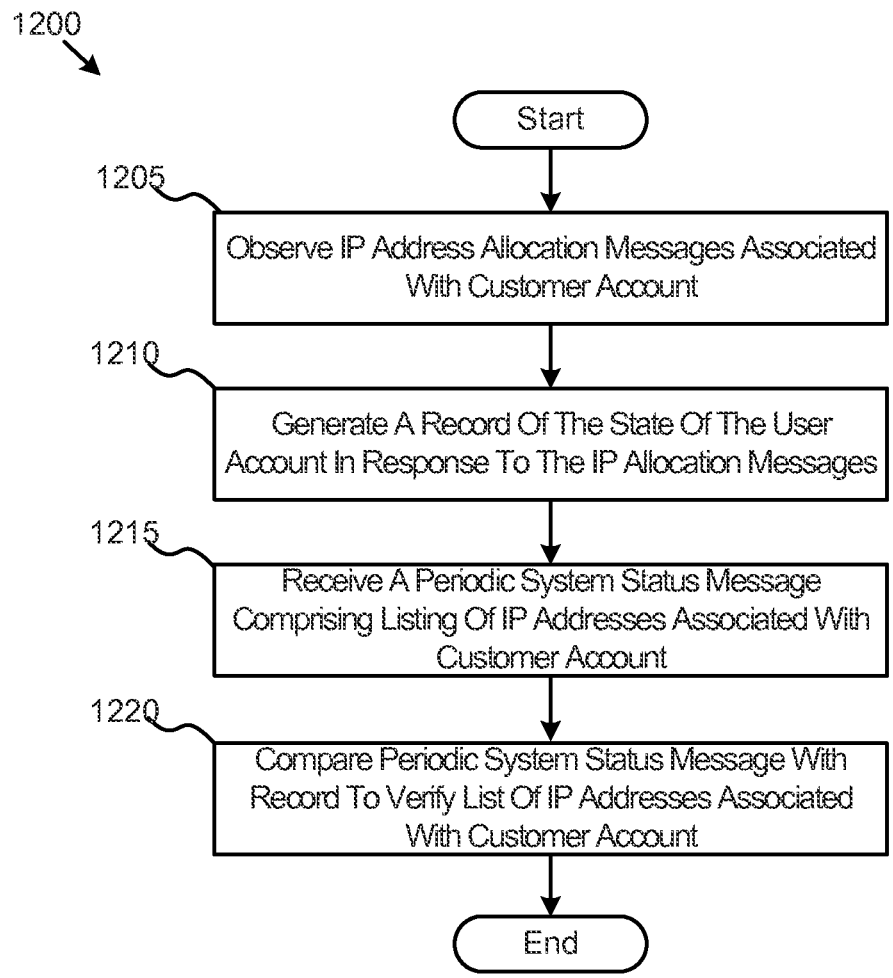
FIG. 12 is a flowchart diagram illustrating another embodiment of a method for tracking and verifying records of system change events in a distributed network system.

Another embodiment is illustrated in FIG. 12. The method 1200 described in FIG. 12 may verify that a list of IP address allocations is accurate. The method 1200 may also provide an opportunity to track potentially fraudulent activities related to IP address allocation. In one embodiment, the method 1200 may also be implemented by event manager 106.

The method 1200 may include observing IP address allocation messages associated with a customer account as shown at block 1205. Alternatively, the IP addresses may be tracked on the basis of the server issuing the IP address. The method 1200 may also include generating a record of the state of the user account in response to the IP allocation messages as shown at block 1210. Alternatively, the record may be generated with reference to a server issuing IP addresses.

As shown at block 1205, the method 1200 may also include receiving a periodic system status message comprising a list of IP addresses associated with the customer account. In an alternative embodiment, the periodic system status message may comprise a list of IP addresses issued by an IP address server, or an IP Address Management (IPAM) process.

The method 1200 may further include comparing the periodic system status message with the record to verify the list of IP addresses associated with the user account as shown at block 1220. Alternatively, the list of IP addresses may be associated with an IP address server or IPAM process.

Figure 13:
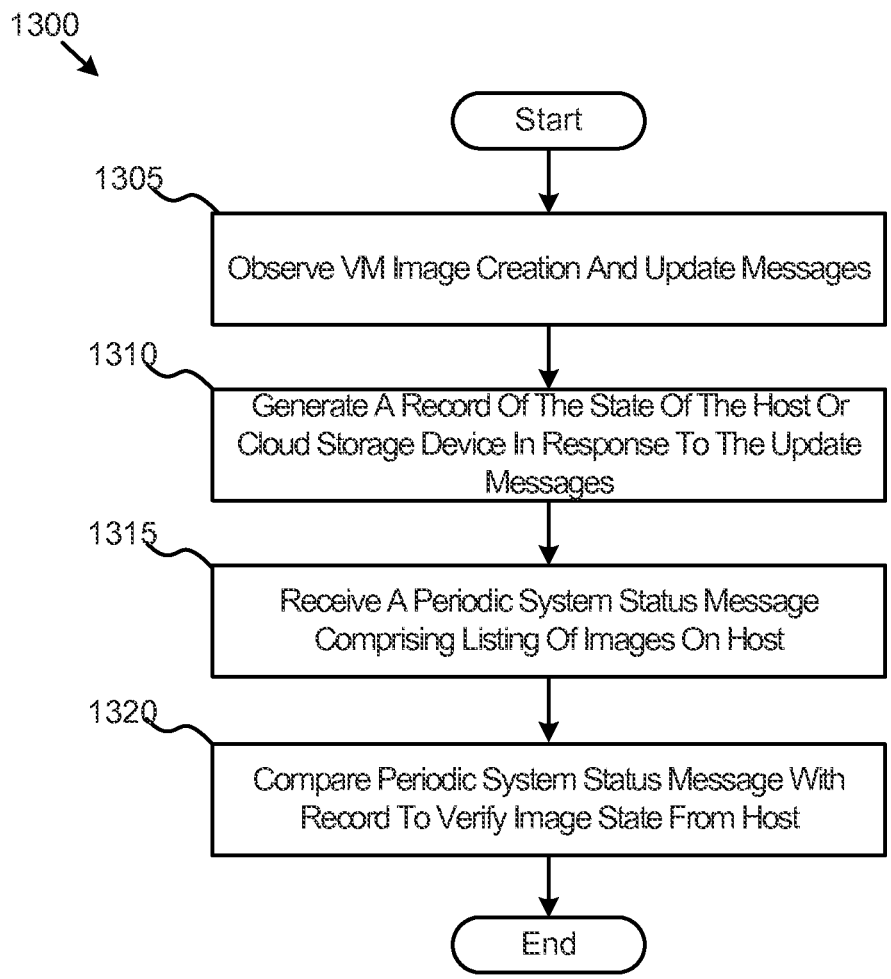
FIG. 13 is a flowchart diagram illustrating another embodiment of a method for tracking and verifying records of system change events in a distributed network system.

FIG. 13 illustrates a further embodiment of a method 1300 for verifying periodic system status messages. In one embodiment, the method 1300 may also be implemented by event manager 106. The method 1300 may include observing one or more VM image creation/update messages as shown at block 1305. The VM images may be snapshots of a VM created by a system administrator, a cloud services reseller, or a customer. The VM image may be updated from time to time, or deleted.

The method 1300 may also include generating a record of the state of the host or cloud storage device configured to store the VM images in response to the update messages as shown at block 1310. The method may further include receiving a periodic system status message comprising a list of images on the host or cloud storage as shown at block 1315. In one embodiment, the method 1300 may also include comparing the system status message with the record to verify the image state from the host or cloud storage as shown at block 1320.

In each of the embodiments described in FIGS. 10-13, the operations of methods 1000-1300 may be carried out by one or more of the components of event manager 106 described in Fig. Each of the various methods described may include further operations. For example, the methods may include determining whether a discrepancy exists between the periodic system status message and the record of the state of the object.

In one embodiment, generating the record may include recording a timestamp associated with each of a plurality of update messages, ordering the update messages chronologically according to the timestamps, and generating a timeline of the state of the object in response to the ordered update messages as illustrated in FIG. 9.

The methods may also include determining a time at which a system error occurred resulting in a discrepancy between the record of the state of the object and the periodic system status message in response to information on the timeline. An alert may be generated in response to a determination that the record of the state of the object and the periodic system status message are inconsistent. The alert may include an electronic notification to a system administrator.

The method may also include updating information in one or more system records or databases associated with the object in response to a determination that a discrepancy exists between the periodic system status message and the record of the state of the object.

Each day, a new record may be generated in response to the periodic system status update message from the previous day, in one embodiment. Indeed, the record of the state of the object may be regenerated in response to update messages received after receipt of the periodic system status message. In such embodiments, the periodic system status message is a starting point for generating the record of the state of the object.

In various embodiments, the periodic system status message may be received hourly, daily, weekly, bi-weekly, monthly, quarterly, yearly, or at any other interval suitable for use with the present embodiments.

In one embodiment, tracking and verifying periodic system status messages is implemented as an electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor, running as a discrete operating environment, as a process in an active operating environment, or can be run from a low-power embedded processor. In a second embodiment, the instruction processor takes the form of a series of interoperating but discrete components, some or all of which may be implemented as software programs. In another embodiment, the instruction processor is a discrete component, using a small amount of flash and a low power processor, such as a low-power ARM processor. In a further embodiment, the instruction processor includes a rule engine as a submodule as described herein.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of tracking and verifying records of system change events in a distributed network system providing cloud services, the method comprising:
   observing one or more update messages sent and received among components of the distributed network system, the update messages comprising information associated with a state of an object on the distributed network system;
   updating a reconstructed state of the object in response to the update messages, wherein the reconstructed state is updated by determining a new reconstructed state based on a previous reconstructed state and the state information of the update message;
   receiving a periodic system status message comprising information regarding the state of the object; and
   comparing the information from the periodic system status message with the reconstructed state of the object to verify the accuracy of the periodic system status message.

2. The method of claim 1, wherein comparing further comprises determining whether a discrepancy exists between the periodic system status message and the reconstructed state of the object.

3. The method of claim 1, wherein updating a reconstructed state further comprises:
   recording a timestamp associated with each of a plurality of update messages;
   ordering the update messages chronologically according to the timestamps; and
   generating a timeline of the reconstructed state of the object in response to the ordered update messages.

4. The method of claim 3, further comprising determining a time at which a system error occurred resulting in a discrepancy between the reconstructed state of the object and the periodic system status message in response to information on the timeline.

5. The method of claim 1, further comprising generating an alert in response to a determination that the reconstructed state of the object and the periodic system status message are inconsistent.

6. The method of claim 5, wherein the alert is an electronic notification to a system administrator.

7. The method of claim 1, wherein the periodic system status message is associated with billing data for the object.

8. The method of claim 7, further comprising updating the billing data for the object in response to a determination that a discrepancy exists between the periodic system status message and the reconstructed state of the object.

9. The method of claim 1, further comprising discarding the reconstructed state of the object upon receipt of the periodic system status message.

10. The method of claim 9, further comprising regenerating the reconstructed state of the object in response to update messages received after receipt of the periodic system status message.

11. The method of claim 10, wherein the periodic system status message is a starting point for generating the reconstructed state of the object.

12. The method of claim 1, wherein the object is a virtual machine (VM) instance generated on the distributed network system.

13. The method of claim 1, wherein the periodic system status message is received daily.

14. A distributed network system, comprising:
   a processor; and
   a memory coupled to the processor, the memory including computer-readable instructions that, upon execution by the processor, cause the system to provide:
   a plurality of service components;
   a message service component to providing update messages between the service components the update messages comprising information associated with a state of an object on the distributed network system; and
   an event manager component configured to:
      observe one or more update messages sent and received among components of the distributed network system;
      update a reconstructed state of the object in response to the update messages, wherein the reconstructed state is updated by determining a new reconstructed state based on a previous reconstructed state and the state information of the update message;
      receive a periodic system status message comprising information regarding the state of the object; and
      compare the information from the periodic system status message with the reconstructed state of the object to verify the accuracy of the periodic system status message.

15. The distributed network system of claim 14, wherein comparing further comprises determining whether a discrepancy exists between the periodic system status message and the reconstructed state of the object.

16. The distributed network system of claim 14, wherein updating a reconstructed state further comprises:
   recording a timestamp associated with each of a plurality of update messages;
   ordering the update messages chronologically according to the timestamps; and
   generating a timeline of the reconstructed state of the object in response to the ordered update messages.

17. The distributed network system of claim 16, further comprising determining a time at which a system error occurred resulting in a discrepancy between the reconstructed state of the object and the periodic system status message in response to information on the timeline.

18. The distributed network system of claim 14, further comprising generating an alert in response to a determination that the reconstructed state of the object and the periodic system status message are inconsistent.

19. The distributed network system of claim 18, wherein the alert is an electronic notification to a system administrator.

20. The distributed network system of claim 14, wherein the periodic system status message is associated with billing data for the object.

21. The distributed network system of claim 20, further comprising updating the billing data for the object in response to a determination that a discrepancy exists between the periodic system status message and the reconstructed state of the object.

22. The distributed network system of claim 14, further comprising discarding the reconstructed state of the object upon receipt of the periodic system status message.

23. The distributed network system of claim 22, further comprising regenerating the reconstructed state of the object in response to update messages received after receipt of the periodic system status message.

24. The distributed network system of claim 23, wherein the periodic system status message is a starting point for generating the reconstructed state of the object.

25. The distributed network system of claim 14, wherein the object is a virtual machine (VM) instance generated on the distributed network system.

26. The distributed network system of claim 14, wherein the periodic system status message is received daily.

27. A non-transitory computer-accessible storage medium storing program instructions that, when executed by a data processing device, cause the data processing device to implement operations for tracking and verifying records of system change events in a distributed network system providing cloud services, the operations comprising:
- observing one or more update messages sent and received among components of the distributed network system, the update messages comprising information associated with a state of an object on the distributed network system;
- updating a reconstructed state of the object in response to the update messages, wherein the reconstructed state is updated by determining a new reconstructed state based on a previous reconstructed state and the state information of the update message;
- receiving a periodic system status message comprising information regarding the state of the object; and
- comparing the information from the periodic system status message with the reconstructed state of the object to verify the accuracy of the periodic system status message.

28. A system for reselling resources of a distributed network, the system comprising:
- a processor; and
- a memory coupled to the processor, the memory including computer-readable instructions that, upon execution by the processor, cause the system to provide:
- a reseller system configured to generate requests for cloud services; and
- a distributed network system communicatively coupled to the reseller system, the distributed network system comprising:
  - a plurality of service components;
  - a message service component configured to provide update messages between the service components the update messages comprising information associated with a state of an object on the distributed network system; and
  - an event manager component configured to:
    - observe one or more update messages sent and received among components of the distributed network system,
    - update a reconstructed state of the object in response to the update messages, wherein the reconstructed state is updated by determining a new reconstructed state based on a previous reconstructed state and the state information of the update message;
    - receive a periodic system status message comprising information regarding the state of the object, and
    - compare the information from the periodic system status message with the reconstructed state of the object to verify the accuracy of the periodic system status message.

29. The system of claim 28, wherein the periodic system status message is associated with billing data for the object.

30. The system of claim 29, wherein the event manager is configured to update the billing data for the object in response to a determination that a discrepancy exists between the periodic system status message and the reconstructed state of the object.

31. The system of claim 30, wherein the reseller system is configured to receive the billing date from the distributed network system.

\* \* \* \* \*